United States Patent [19]
Bencheck et al.

[11] Patent Number: 6,072,777
[45] Date of Patent: *Jun. 6, 2000

[54] SYSTEM AND METHOD FOR UNREPORTED ROOT CAUSE ANALYSIS

[75] Inventors: Michael Bencheck, Garland; Robert Branton, Farmers Branch; Curtis Brownmiller, Richardson; Mark DeMoss, The Colony; Steve Landon, Richardson; Minh T. Tran, Plano, all of Tex.

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/668,516

[22] Filed: Jun. 28, 1996

[51] Int. Cl.[7] .............................. H04L 12/26; G05B 23/02
[52] U.S. Cl. ........................ 370/244; 370/465; 340/825.06
[58] Field of Search ..................................... 370/241, 242, 370/246, 247, 248–250, 465, 466, 522; 340/521–523, 825.66, 825.01, 825.06; 364/514 B; 371/20.1, 20.2; 714/43, 47

[56] References Cited

U.S. PATENT DOCUMENTS

| | | | |
|---|---|---|---|
| 4,937,825 | 6/1990 | Ballard et al. | 371/20.1 |
| 4,964,112 | 10/1990 | Appelmann | 370/248 |
| 5,157,667 | 10/1992 | Carusone, Jr. et al. | 371/29.1 |
| 5,189,674 | 2/1993 | Shimizu | 370/20.1 |
| 5,212,475 | 5/1993 | Thoma | 370/242 |
| 5,233,600 | 8/1993 | Pekarske | 370/14 |
| 5,299,201 | 3/1994 | Carusone, Jr. et al. | 371/51 |
| 5,412,652 | 5/1995 | Lu | 370/85.12 |
| 5,436,909 | 7/1995 | Dev et al. | 371/20.1 |
| 5,452,306 | 9/1995 | Turudic et al. | 370/110.1 |
| 5,455,832 | 10/1995 | Bowmaster | 371/20.1 |
| 5,461,628 | 10/1995 | Nakamura | 371/20.1 |
| 5,463,634 | 10/1995 | Smith et al. | 371/20.6 |
| 5,473,506 | 12/1995 | Garafola et al. | 370/241 |
| 5,483,520 | 1/1996 | Eychenne et al. | 370/16.1 |
| 5,495,470 | 2/1996 | Tyburski et al. | 370/14 |
| 5,555,248 | 9/1996 | Sugawara | 370/248 |
| 5,566,162 | 10/1996 | Gruber et al. | 370/13 |
| 5,652,787 | 7/1997 | O'Kelly | 379/112 |
| 5,864,662 | 1/1999 | Brownmiller et al. | 714/43 |

OTHER PUBLICATIONS

Banerjee et al., "ISDN Primary Rate Access Maintenance," *IEEE,* 1989, pp. 2.6.1–2.6.5.

Cadieux et al., "A New Network Element for Performance Monitoring and Test Access Spanning the Digital Hierarchy," *IEEE,* 1990, pp. 324.4.1–334.4.5.

Kerschberg et al., "Intelligent Network Management: A Heterogeneous Knowledge Source Approach," *IEEE,* 1990, pp. 314–316.

Mageed et al., "Fault Detection and Indentification Using a Hierarchical Neural Network–Based System", *IEEE,* 1993, pp. 338–343.

*Primary Examiner*—Chi H. Pham
*Assistant Examiner*—Steven Nguyen

[57] ABSTRACT

A system and method for determining a root cause of error activity in a network is described herein. Root cause analysis includes the correlation between reported error activity for path, line and section entities along a provisioned channel in the network. Root causes can also be identified based upon the correlation of simultaneous error activity on various signal transport levels. Finally, root cause analysis can correlate error activity along various path entities.

25 Claims, 17 Drawing Sheets

SYSTEM AND METHOD FOR UNREPORTED ROOT CAUSE ANALYSIS

CROSS-REFERENCE TO OTHER APPLICATIONS

The following applications of common assignee contain some common disclosure:

U.S. Patent Application entitled "System and Method for Identifying the Technique Used for Far-End Performance Monitoring of a DS1 at a Customer Service Unit," Ser. No. 08/671,028, filed Jun. 25, 1996.

U.S. Patent Application entitled "System and Method for Formatting Performance Data In a Telecommunications System," Ser. No. 08/670,905, filed Jun. 26, 1996.

U.S. Patent Application entitled "System and Method for Reported Root Cause Analysis," Ser. No. 08/670,844, filed Jun. 28, 1996.

U.S. Patent Application entitled "Enhanced Correlated Problem Alert Signals," Ser. No. 08/670,848, filed Jun. 28, 1996.

U.S. Patent Application entitled "Correlated Problem Alert Signals," Ser. No. 08/673,271, filed Jun. 28, 1996.

U.S. Patent Application entitled "Raw Performance Monitor Correlated Problem Alert Signals," Ser. No. 08/670,847, filed Jun. 28, 1996.

U.S. Patent Application entitled "System and Method for Reported Trouble Isolation," Ser. No. 08/672,812, filed Jun. 28, 1996.

U.S. Patent Application entitled "System and Method for Unreported Trouble Isolation," Ser. No. 08/672,513, filed Jun. 28, 1996.

U.S. Patent Application entitled "System and Method for Monitoring Point Identification," Ser. No. 08/672,512, filed Jun. 28, 1996.

U.S. Patent Application entitled "System and Method for End-to-End Threshold Setting," Ser. No. 08/670,845, filed Jun. 28, 1996.

U.S. Patent Application entitled "System and Method for Monitoring Point Activation," Ser. No. 08/672,356, filed Jun. 28, 1996.

U.S. Patent Application entitled "System and Method for Tracking and Monitoring Network Elements," Ser. No. 08/671,029, filed Jun. 25, 1996.

The above-listed applications are incorporated herein by reference in their entireties.

BACKGROUND OF THE INVENTION

1. Field of the Invention

The present invention relates generally to network management systems, and more specifically is directed toward the determination of a root cause of error activity at one or more signal transport levels.

2. Related Art

The present application is a continuation of Application Ser. No. 08/668,516 filed Jun. 28, 1996 Entitled "System and Method for Unreported Root Cause Analysis".

Telecommunication service providers (e.g., MCI Telecommunications Corporation) provide a wide range of services to their customers. These services range from the transport of a standard 64 kbit/s voice channel (i.e., DS0 channel) to the transport of higher rate digital data services (e.g., video). Both voice channels and digital data services are transported over the network via a hierarchy of digital signal transport levels. For example, in a conventional digital signal hierarchy 24 DS0 channels are mapped into a DS1 channel. In turn, 28 DS1 channels are mapped into a DS3 channel.

Routing of these DS1 and DS3 channels within a node of the network is performed by digital cross-connect systems. Digital cross-connect systems typically switch the channels at the DS1 and DS3 signal levels. Transmission of channels between nodes is typically provided via fiber-optic transmission systems. Fiber-optic transmission systems can multiplex a plurality of DS3 channels into a higher rate transmission over a single pair of fibers. In one example, signal formats for the fiber-optic transmission systems are defined by the manufacturer. These proprietary systems are referred to as asynchronous transmission systems.

Alternatively, a fiber-optic transmission system can implement the synchronous optical network (SONET) standard. The SONET standard defines a synchronous transport signal (STS) frame structure that includes overhead bytes and a synchronous payload envelope (SPE). One or more channels (e.g., DS1 and DS3 channels) can be mapped into a SPE. For example, a single DS3 channel can be mapped into a STS-1 frame. Alternatively, 28 DS1 channels can be mapped into virtual tributaries (VTs) within the STS-1 frame.

Various STS-1 frames can be concatenated to produce higher rate SONET signals. For example, a STS-12 signal includes 12 STS-1 frames, while a STS-48 signal includes 48 STS-1 frames. Finally, after an STS signal is converted from electrical to optical, it is known as an optical carrier (OC) signal (e.g., OC-12 and OC-48).

An end-to-end path of a provisioned channel within a network typically traverses a plurality of nodes. This provisioned channel is carried over transmission facilities that operate at various rates in the digital signal hierarchy. For example, a provisioned DS1 channel may exist as part of a DS3, VT1.5, STS-1, STS-12, OC-12, and OC-48 signal along parts of the end-to-end path. This results due to the multiplexing and demultiplexing functions at each of the nodes.

One of the goals of a network management system is to monitor the performance of the provisioned channel. Performance of the provisioned channel can include various measures. One measure is the unavailability of the provisioned channel. Unavailability is generally defined as the amount (or fraction) of time that a channel is not operational. Various causes such as cable cuts can lead to channel downtime. Network responses to channel downtime can include automatic protection switching or various restoration procedures (e.g., digital cross-connect distributed restoration).

Although unavailability is a major performance measure from a customer's standpoint, other performance measures can also be critical. For example, if a customer desires a digital data service for the transmission of financial data, the number of errored seconds or severely errored seconds may be a concern.

In conventional network management systems, performance monitoring is accomplished in piecewise fashion. For example, consider a provisioned channel that traverses an end-to-end path comprising asynchronous transmission systems and SONET transmission systems. Performance monitoring information for these two types of transmission systems is typically maintained in separate databases. Moreover, the various types of transmission systems may be provided by multiple vendors. Each of these vendors may define their own separate performance monitoring process. For example, the vendor-controlled process may define the types of data that are retrieved from or reported by the individual network elements.

In this environment, comprehensive performance monitoring analysis is difficult to accomplish. What is needed is a network management system that can monitor provisioned channels at various points of the end-to-end path and identify the root cause of problems that lead to observable error activity. This capability allows a service provider to efficiently resolve problems that lead to degradation of network performance.

SUMMARY OF THE INVENTION

The present invention satisfies the above mentioned needs by providing a comprehensive network management system that can isolate a root cause of a problem in the network. In a first embodiment of the present invention, the root cause analysis operates on problem alert signals (PASs) generated by monitoring points in the network. One example of a problem alert signal is a threshold crossing alert. A threshold crossing alert is generated when a monitored performance parameter exceeds a predefined threshold.

In a second embodiment of the present invention, the root cause analysis operates on reported error activity. Statistical analysis can be used to identify facility operating conditions that could lead to a significant network problem. For example, the network facility could be operating at a point near the tolerance levels. Intermittent errors could therefore result due to temporary excursions beyond the tolerance thresholds. If a statistical analysis identifies a potential problem, a raw performance monitoring PAS is generated.

In the present invention, root cause analysis seeks to identify sources of problems identified by a plurality of PASs that are visible to a layer in a network management system. Analysis of the plurality of PASs include various correlation processes. In one method, path PASs are correlated to line PASs. In this manner, error activity identified on a provisioned channel can be isolated to a particular line entity of the network. Further, in a second method of root cause analysis, line PASs are correlated to section PASs. This second correlation process allows error activity identified on a line entity to be isolated to a particular section entity within the line entity. As part of this general correlation process, the root cause analysis correlates error activity between signal levels in the signal transport hierarchy. In this method of analysis, the highest transport level experiencing error activity is identified. In this manner, the network facilities that are the source of the problem can be identified.

An additional method of root cause analysis also correlates error activity between path entities. Error activity on various path entities may be caused by a common facility problem that is not detected by line entities within the path entity. Identification of common line entities within the various path entities eliminates redundant root cause analysis processing of the individual path entities.

The foregoing and other features and advantages of the invention will be apparent from the following, more particular description of a preferred embodiment of the invention, as illustrated in the accompanying drawings.

BRIEF DESCRIPTION OF THE FIGURES

In the drawings, like reference numbers indicate identical or functionally similar elements. Additionally the left-most digit of a reference number identifies the drawing in which the reference number first appears.

DETAILED DESCRIPTION OF THE PREFERRED EMBODIMENTS

The operation and administration of a service provider's network is becoming increasingly complex. Network elements continue to evolve in support of the provision of a wider range of services. The overriding goal of network management is to ensure that all aspects of the network are operating according to both the service provider's design and the customer's expectations.

A general open-ended framework is defined by the International Telecommunications Union (ITU) Telecommunications Management Network (TMN) standard. The TMN standard defines a layered framework for a service provider to implement its own network management process.

Figure 1:
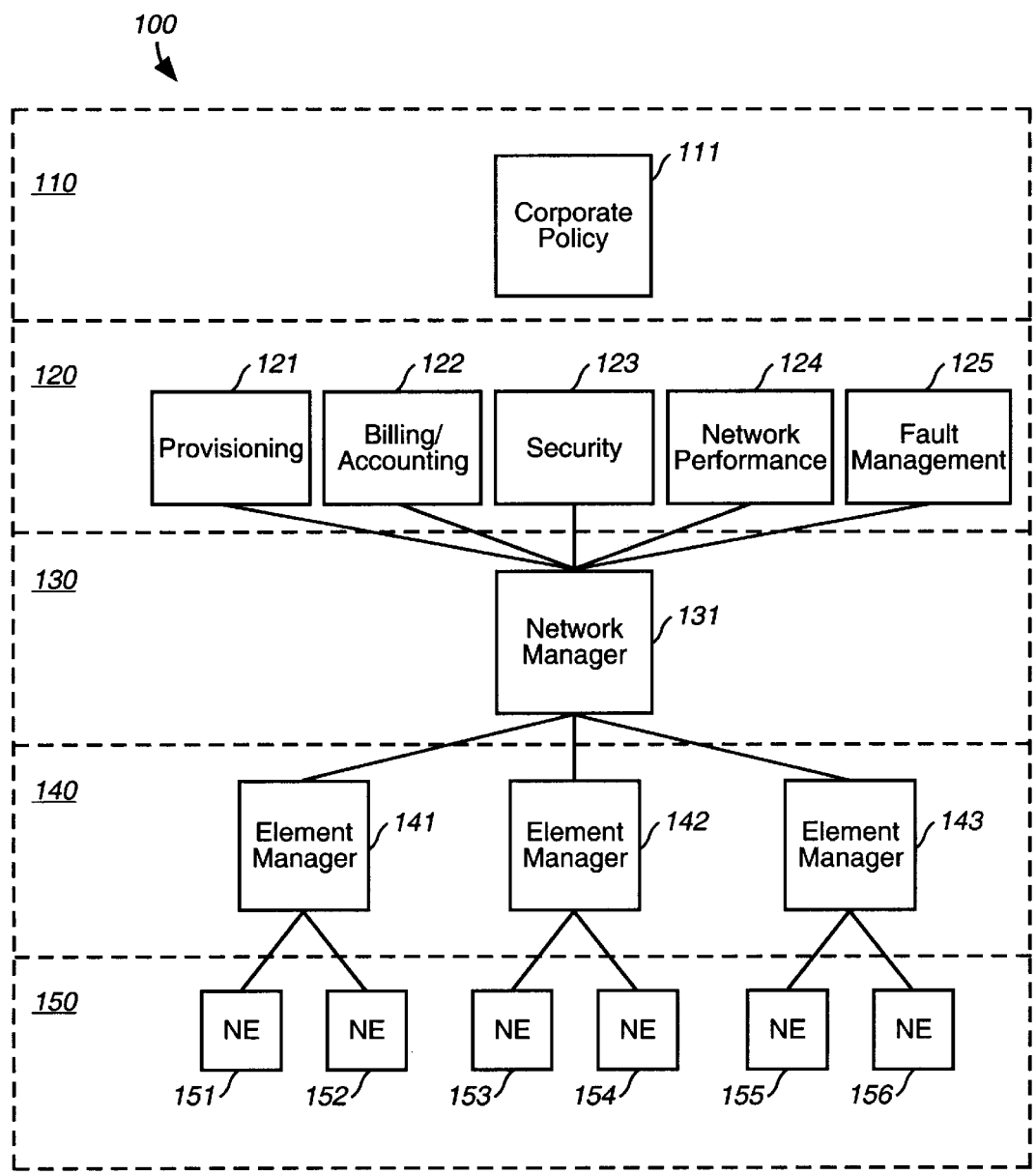
FIG. 1 illustrates the layers in a network management system.

FIG. 1 illustrates a network management system 100 that includes five layers 110, 120, 130, 140 and 150. Layer 150 is designated as the network element layer (NEL). The NEL is a physical layer that includes the various network elements (e.g., asynchronous systems, SONET systems, etc.) used in the transport and routing of network traffic (e.g., DS1, DS3, OC-N, etc.). Each network element 151–156 in NEL 150 can be designed to provide performance monitoring, alarm and status information to the higher layers in network management system 100. In particular, network elements 151–156 are connected to one of the element managers 141–143 in element management layer (EML) 140. For example, network elements 151 and 152 are connected to element manager 141. In this manner, each network element manager 141–143 controls a portion of the physical network embodied in NEL 150.

Element managers 141–143 can retrieve information from network elements 151–156 periodically or upon a user request. Alternatively, network elements 151–156 can be programmed to provide element managers 141–143 with a predefined subset of network management information at predefined time intervals. The domain of an element manager 141–143 can be defined by a vendor's equipment. In some situations, the domain of an element manager 141–143 is dictated by the geography in which network elements 151–156 reside.

After network management information is acquired by element managers 141–143 from network elements 151–156, it is forwarded to network management layer (NML) 130. NML 130 comprises network manager 131. Network manager 131 is logically shown as a single entity. In implementation, network manager 131 can comprise one or more sites. For example, multiple service centers (not shown) can exist at different parts of the country (e.g., east coast and west coast). In combination, these national-level service centers combine to provide total visibility of the physical network in NEL 150. Network manager 131 can also be split among services and/or network elements. For example, in one embodiment, a first network manager is dedicated to asynchronous parts of the network, a second network manager is dedicated to DS1, DS3 and VT-n traffic, and a third network manager is dedicated to STS-n and OC-n traffic.

Generally, the logical entity identified as network manager 131 is a resource that is accessed by applications in service management layer (SML) 120. In FIG. 1, SML 120 is shown to include five applications 121–125. Specifically, SML 120 includes provisioning application 121, accounting/billing application 122, security application 123, network performance application 124, and fault management application 125. This listing of applications is provided without limitation. Any other application that utilizes network management data stored within NEL 150 can also be included. Note that elements of applications 121–125 also reside within EML 140 and NML 130.

Provisioning application 121 provides a customer interface for the provisioning of various services. For example, a customer can indicate a desire for a DS1 digital data service between network element 151 and network element 155. Upon receipt of this customer request, provisioning application 121 relays the provisioning commands to network manager 131. Network manager 131 then communicates with element managers 141, 143 and any other element managers that control a part of the end-to-end path to set up the DS1 connection from network elements 151–155.

Applications 122–125 can similarly support a customer interface by providing access to billing information, security information, performance information and fault management information, respectively. Each of these applications also access the resources that are stored within network manager 131.

Finally, network management system 100 also includes business management layer (BML) 110. BML 100 includes logical entity 111. Logical entity 111 represents the general corporate policy of network management system 100. Corporate policy 111 dictates the general business and contractual arrangements of the service provider.

Having identified the various layers in network management system 100, a system and method for root cause analysis is now described. Root cause analysis is generally concerned with the identification of a source of a problem in the network. Problems in the network may or may not involve actual system downtime. In other words, problems in the network may manifest themselves as degradations in system performance. An example of performance degradation includes an increase in the bit error rate (BER). Bit errors are typically measured in terms of errored seconds (ESs) and severely errored seconds (SESs). An unacceptable increase in the BER of the provisioned channel may prove unsatisfactory to the customer. In many instances, customer expectations of performance of a provisioned channel are defined by the requirements contained within a service contract. The service contract may correlate system performance to the tariffing structure. If the number of ESs, SESs or unavailability of the service becomes excessive, customer rebates may be in order.

In a competitive business climate, it is desirable for a service provider to quickly identify and repair problems leading to system downtime or degradation. If a root cause of a problem cannot be pinpointed, it will continue to affect system performance and a customer's perceptions. The present invention provides a system and method for identifying the root cause of network problems using a comprehensive approach. This comprehensive approach analyzes the information stored in one or more layers of network management system 100.

In a first embodiment, root cause analysis is operative on error activity that is reported from monitoring points that are associated with network elements 151–156. Monitoring points are described in greater detail in related applications entitled "System and Method for Monitoring Point Identification," Ser. No. 08/672,512, filed Jun. 28, 1996; "System and Method for End-to-End Threshold Setting," Ser. No. 08/670,845, filed Jun. 28, 1996; and "System and Method for Monitoring Point Activation," Ser. No. 08/672,356, filed Jun. 28, 1996.

Figure 2:
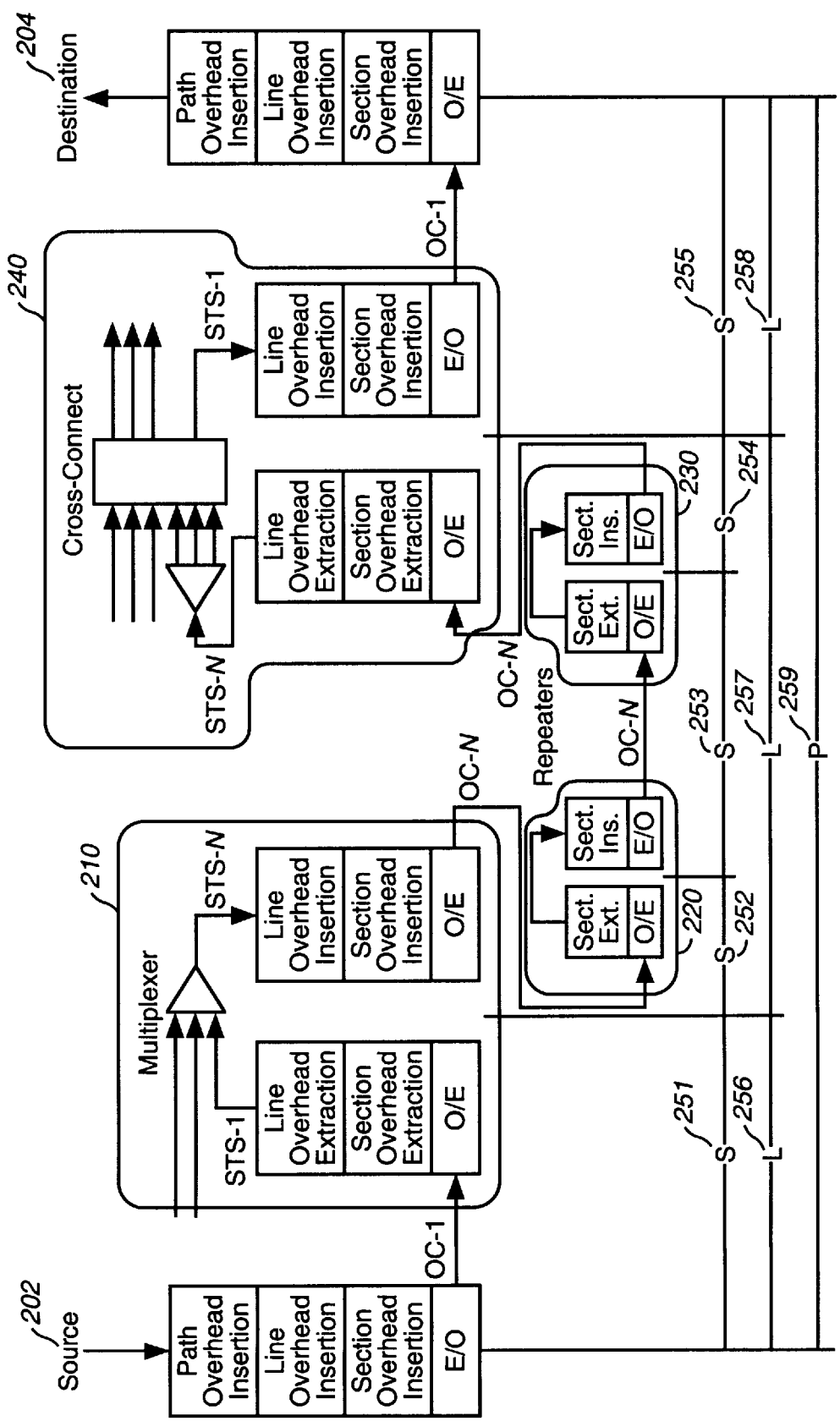
FIG. 2 illustrates an exemplary circuit topology.

Generally, monitoring points are labeled as either primary monitoring points or secondary monitoring points. A basic monitoring point strategy for a generic end-to-end path includes the placement of monitoring points nearest to the facility end points. Monitoring points nearest to the facility end points are designated as primary monitoring points (PMPs). A facility end point can be thought of as a generic customer termination point (e.g., handoff point to a business, local exchange carrier, etc.). In the context of FIG. 2, PMPs can be associated with source 202 and destination 204.

In addition to the PMPs, a provisioned channel may also include SMPs. SMPs are intermediate performance monitoring data collection points. SMPs allow network management system 100 to isolate a network problem by providing performance monitoring information at intermediate sections of the end-to-end path.

Over a period of time, a monitoring point associated with a network element may observe an excessive number of ESs on a received channel. If the monitoring point determines that the error activity is significant, a problem alert signal (PAS) is reported to one of element managers 141–143. Note that any type of statistical analysis can be used by the monitoring point to determine whether to report a PAS to an element manager 141–143. For example, the monitoring point could determine whether a number of ESs exceeds a predefined threshold. In the remainder of the description, PASs are used to describe the general class of reported error activity.

Note that a monitoring point can generate a PAS based upon error activity measured at section, line, and path terminating points. FIG. 2 illustrates section, line and path entities in an exemplary channel (e.g., DS1, DS3, VT-n, STS-1, STS-3c, STS-12c, etc.) provisioned between source 202 and destination 204. In this example, the channel originates at source 202, traverses multiplexer 210, regenerators 220 and 230, and cross-connect 240, and finally terminates at destination 204. Each network element 202, 204, 210, 220, 230 and 240 inserts and extracts overhead information. In the SONET context, section and line overhead information is contained within the transport overhead portion of a synchronous transport signal (STS) frame (not shown). Path overhead information, on the other hand, is contained within the synchronous payload envelope (SPE) information payload. Note that the terms section, line and path are used without limitation. As would be apparent to one of ordinary skill in the relevant art, the root cause analysis described below could also be extended to other network transmission standards having analogous network sectionalization.

In the following description, section, line and path entities are used to refer to the portions of the network that insert and extract section, line and path overhead bytes, respectively. For example, the OC-N link between regenerators 220 and 230 define a section entity. In the transmission from regenerator 220 to regenerator 230, regenerator 220 inserts the section overhead bytes into the STS-N frame, performs an electrical-to-optical conversion of the STS-N signal, and transmits the OC-N signal to regenerator 230. Regenerator 230 then receives the OC-N signal, performs an optical-to-electrical conversion and extracts the section overhead information. Regenerator 230 can use the extracted section overhead information to determine the error performance of the transmission from regenerator 220. For example, errors may have been created by a problem with the optical fiber, a problem with a fiber-optic connector, etc. A monitoring point associated with regenerator 230 tracks this error performance over a monitoring period and reports the accumulated results to an element manager 141–143. Note that regenerators 220 and 230 extract only the section overhead information. For this reason, the span between regenerators 220 and 230 define section entity 252 not line or path entities.

Next, consider the span between multiplexer 210 and cross-connect 240. In this span, multiplexer 210 and cross-connect 240 insert and extract both line and section overhead information. Note that only one direction of the two-way communication is illustrated. As shown, the insertion and extraction of line overhead information defines line entity 257. Line entity 257 includes section entities 252–254. Finally, consider source 202 and destination 204. These elements insert and extract path overhead information, thereby defining path entity 259. Path entity 259 includes section entities 251–255 and line entities 256–258.

In considering the network as a whole, each channel provisioned over a plurality of network elements defines its own section, line and path entities. Monitoring points associated with these network elements can monitor error activity for section, line or path entities. Based upon the monitored error activity, a monitoring point can determine whether a PAS should be generated. This PAS is sent to an element manager 141–143. The PAS can also be forwarded to higher layers in network management system 100.

During a single monitoring period, monitoring points for the various provisioned channels in the network can report section, line and path PASs. Each layer in network management system 100 can analyze the reported PASs to determine whether one or more root causes exist. The root cause analysis can simultaneously utilize one or more of the following methods of PAS analysis.

Figure 3:
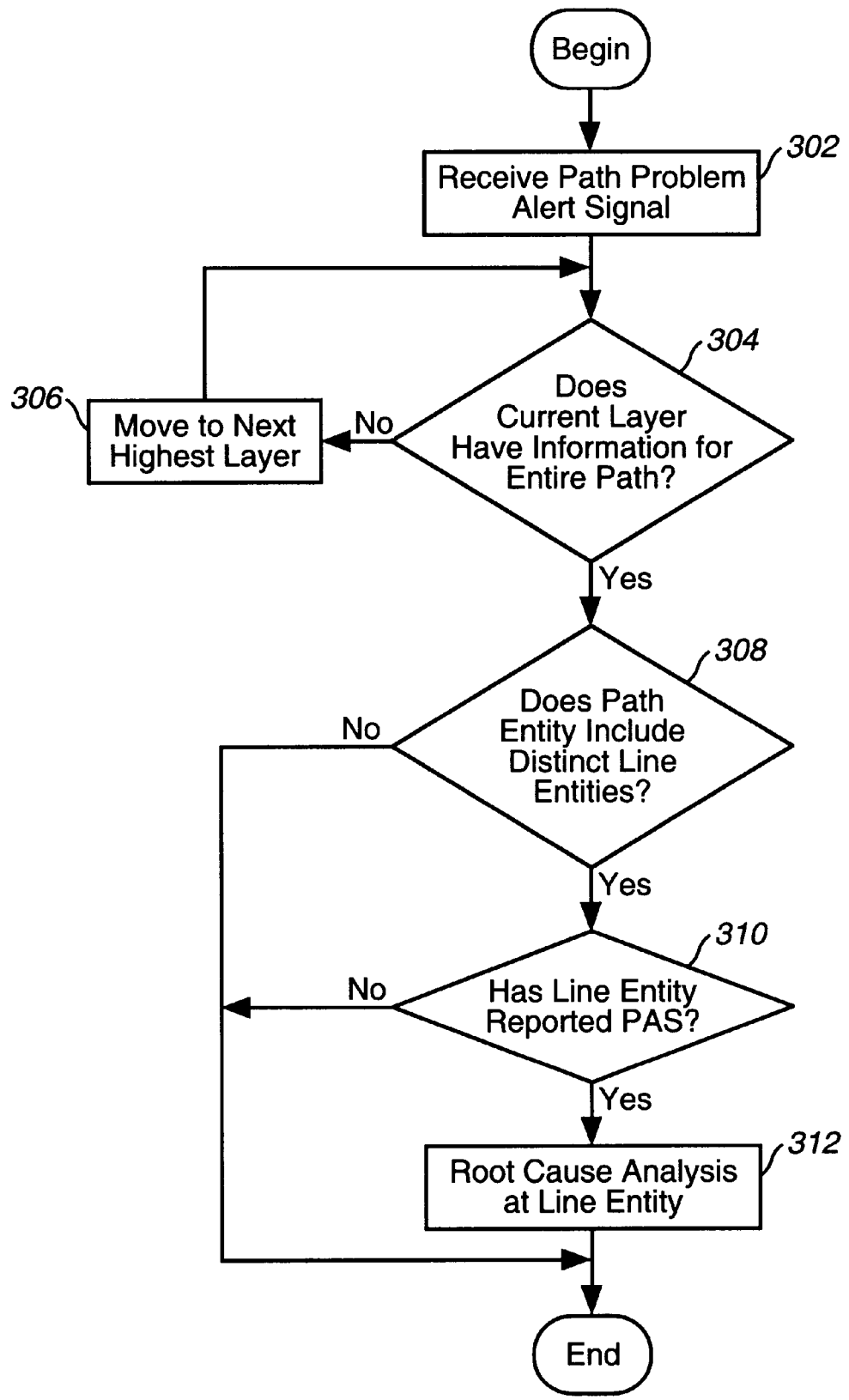
FIGS. 3 and 7 illustrate flow charts of the correlation process between path and line entities.

A first method of analysis is based upon the relationship between path entities and line entities. FIG. 3 illustrates a flow chart of the path and line entity correlation process. The process begins at step 302 where a layer in network management system 100 receives a path PAS. Assume that a monitoring point associated with destination 204 has reported a path PAS to element manager 143. Element manager 143 then determines, at step 304, whether it has enough information to identify the root cause of the network problem.

Recall that each element manager 141–143 has access to network management information received from a subset of network elements 151–156. If the reported PAS was caused by a problem outside of an element manager's domain, then that particular element manager cannot isolate the problem. Various sequences of decisions are used by each element manager 141–143 to determine if the problem can be isolated.

For example, consider the reported performance parameter of severely errored seconds (SESs). SESs can be classified into two types, line SESs (SESL) and path SESs (SESP). If a PAS is generated based upon an excessive number of SESLs, then the element manager knows that the problem is local. Assuming that both ends of the line reside in the element manager's domain, the element manager can conclude that the network problem can be isolated.

If a PAS is triggered based upon an excessive number of SESPs, then the element manager knows that the network problem may not necessarily reside in the element manager's domain. An additional determination must be made as to whether the originating and terminating network elements reside in the element manager's domain. If both reside in the element manager's domain, then the element manager knows that it can isolate the network problem.

As would be apparent to one of ordinary skill in the relevant art, implementation dependent decision trees can be designed to determine whether a root cause of a network problem can be isolated based upon a specific type of PAS. If an element manager 141–143 determines that it does not have enough information to identify the root cause of the network problem, then the root cause analysis must be performed by the next highest layer in network management system 100 (i.e., NML 130). This is illustrated by step 306. Note that network manager 131 of NML 130 begins the isolation process as soon as a PAS is received from one of element managers 141–143.

Once control passes to NML 130, network manager 131 similarly determines whether it has enough information to isolate the problem. As noted above, in one embodiment multiple network managers are used. In this case, root cause analysis is performed by an application in SML 120 using the resources contained in the multiple network managers.

In the following description, assume that element manager 143 determines, at step 304, that it has enough information to identify the root cause. Next, element manager 143 determines, at step 308, whether a distinct line entity exists for the path entity. In other words, element manager 143 determines whether the path entity includes more than one line entity. If a path entity includes only one line entity, then the line and path overhead information inserted at source 202 is extracted at the same point. In the context of FIG. 2, this scenario would arise if multiplexer 210, regenerators 220 and 230, and cross-connect 240 did not exist.

If element manager 143 determines, at step 308, that the path entity does not include distinct line entities, then the path-line correlation process of FIG. 3 ends. In this case, the root cause analysis cannot be further narrowed to a part of the path entity. However, if element manager 143 determines, at step 308, that the path entity does include distinct line entities, then element manager 143 next determines, at step 310, whether a line entity within the path entity has reported a corresponding PAS.

If none of the line entities within the path entity has reported a corresponding PAS, then the path-line correlation process ends. This results since the reported PASs within the current monitoring period does not contain enough line entity information to further identify the root cause of the path PAS. In one example, the root cause of the path PAS may not have been identified by monitoring points associated with the line entities. In another example, the monitoring points associated with the line entities may not have been activated. Subsequent activation of the monitoring points will allow further root cause analysis in a later monitoring period.

Finally, if element manager 143 determines, at step 310, that a line entity has reported a corresponding PAS, then the root cause of the network problem is narrowed to a particular line entity. Additional root cause analysis then proceeds at step 312 to further identify the root cause of the problem within the identified line entity. For example, the root cause could reside in a section entity within the line entity. Note that more than one line entity within a path entity can report a corresponding PAS. For example, errors within line entities 256 and 257 of FIG. 2 could both be sufficient to trigger the reporting of a PAS.

Figure 4:
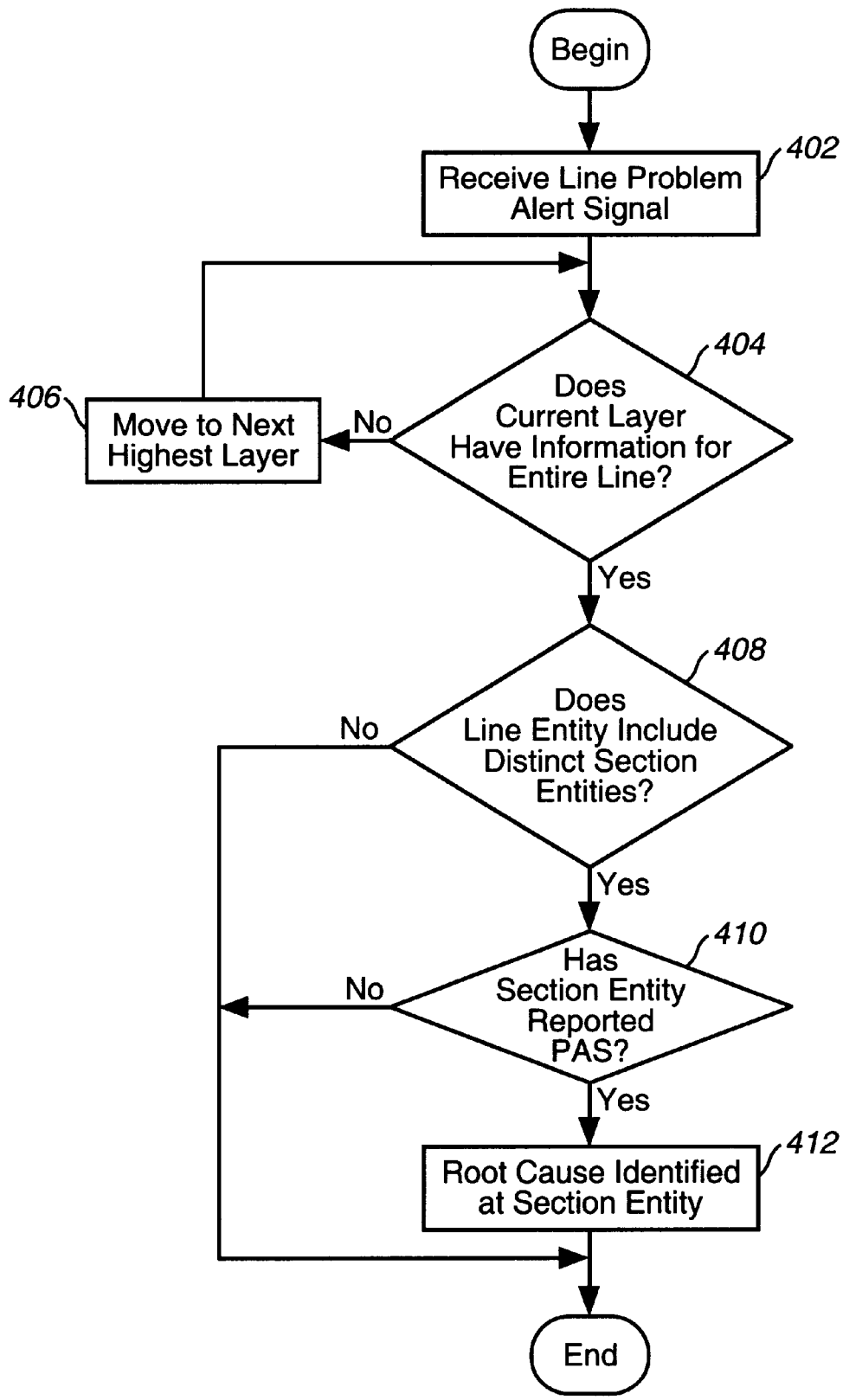
FIGS. 4 and 8 illustrate flow charts of the correlation process between line and section entities.

FIG. 4 illustrates a second method of root cause analysis that is based upon the correlation of PASs reported by line entities and section entities. The line-section correlation process begins at step 402 where a layer in network management system 100 receives a line PAS. In the following discussion, assume that a monitoring point associated with cross-connect 240 has reported a line PAS to element manager 143. Element manager 143 then determines, at step 404, whether it has enough information to identify the root cause of the network problem. For example, if a line PAS is generated by a monitoring point associated with cross-connect 240 of line entity 257, element manager 143 may determine that multiplexer 210 and regenerator 220 are in another element manager's domain. In this case, root cause analysis of the line PAS is performed at a higher layer in network management system 100 that has access to information for line entity 257.

If element manager 143 determines, at step 404, that it has enough information to identify the root cause, then element manager 143 determines, at step 408, whether a distinct section entity exists for the line entity. In the example of line entity 257, distinct section entities 252–254 would exist.

If element manager 143 determines, at step 408, that the line entity does not include distinct section entities, then the line-section correlation process of FIG. 4 ends. In this case, the root cause analysis cannot be further narrowed to a part of the line entity. However, if element manager 143 determines, at step 408, that the line entity does include distinct section entities, then element manager 143 next determines, at step 410, whether a section entity within the line entity has reported a corresponding PAS.

If none of the section entities within the line entity has reported a corresponding PAS, then the line-section correlation process ends. This results since the reported PASs within the current monitoring period does not contain enough section entity information to further identify the root cause of the line PAS. In a similar manner to the line-section correlation process described above, the path-line correlation process could result if the monitoring points associated with the section entities have not been activated.

Finally, if element manager 143 determines, at step 410, that a section entity has reported a corresponding PAS, then the root cause of the network problem is narrowed to the particular section entity. Since the section entity is the lowest level of granularity, the root cause analysis is complete. Thus, at step 412, the section entity is identified as the root cause of the network problem. Again, note that more than one section entity within a line entity can report a PAS.

As described above, a function of the root cause analysis is to correlate PASs. Path PASs can be correlated with line PASs and line PASs can be further correlated to section PASs. As part of this general correlation process a layer in network management system 100 correlates PASs between various signal levels in the transport hierarchy. Generally, when error activity is detected at a particular digital transport level, the correlation of that error activity to other error activity within the digital transport level hierarchy is not a simple matter. For example, error activity detected at the DS3 level may not be detected at the STS-48 level. This may result due to the insufficient granularity of the error detection at the higher STS-48 level. An error at the STS-48 level may affect some or all of the lower transport levels within the STS-48 signal depending on the severity and the distribution of the error event. For example, bursty errors may affect only some of the lower transport levels while a continuous error may affect all lower transport levels. For this reason, performance monitoring data is collected at different hierarchial signal transport levels and error activity is correlated between the different signal transport levels.

In this correlation process, the highest rate in the transport signal hierarchy experiencing simultaneous error activity is identified. FIGS. 5A–5D illustrate this correlation process of identifying the highest signal transport level that experiences simultaneous error activity. In the following description, assume that element manager 141 has received a DS1 path PAS from a network element in its domain.

First, at step 502, element manager 141 determines whether the DS1 channel is mapped into a DS3 channel or into a VT-1.5 channel. If the DS1 channel is mapped into a DS3 channel, the process continues at step 506. At step 506, element manager 141 determines whether the DS3 in which the DS1 is mapped has reported a PAS. In other words, element manager 141 determines whether the DS3 in which the DS1 is mapped has simultaneous error activity occurring.

In a similar manner to step 506, step 508 is invoked if element manager 141 determines, at step 502, that the DS1 is mapped into a VT-1.5 channel. At step 308, element manager 141 determines whether the VT-1.5 in which the DS1 is mapped has reported a PAS. Again, element manager 141 determines whether the VT-1.5 has simultaneous error activity occurring.

If the determination at either step 504 or step 506 determines that the VT-1.5 or DS3, respectively, has not reported a PAS, then element manager 141 reports the DS1 path PAS to network manager 131 in NML 130. Next, at step 510, the highest transport level is identified as a DS1 and the process ends.

Figure 5A:
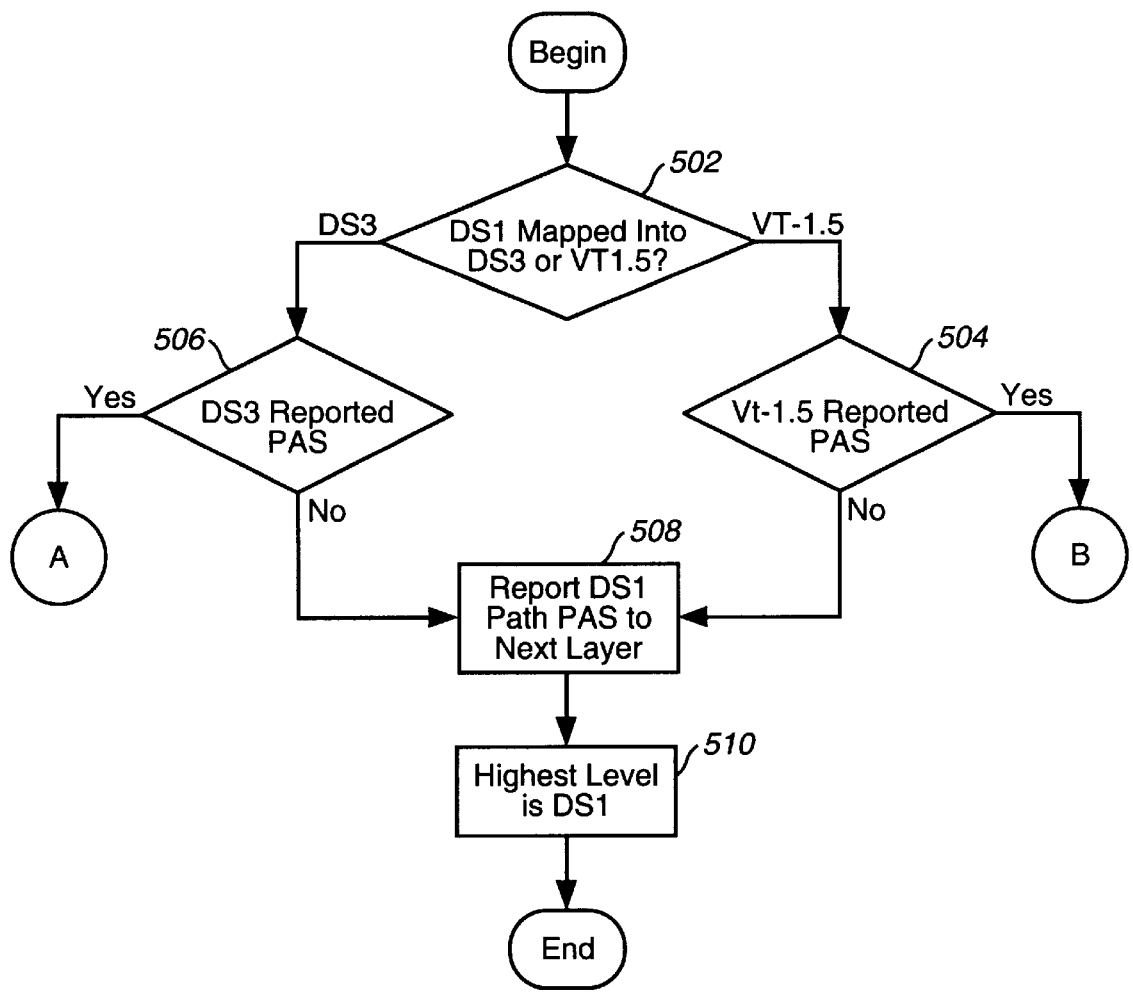
FIGS. 5A–5D and 9A–9D illustrate flow charts of the correlation between levels in the digital signal transport hierarchy.
Figure 5B:
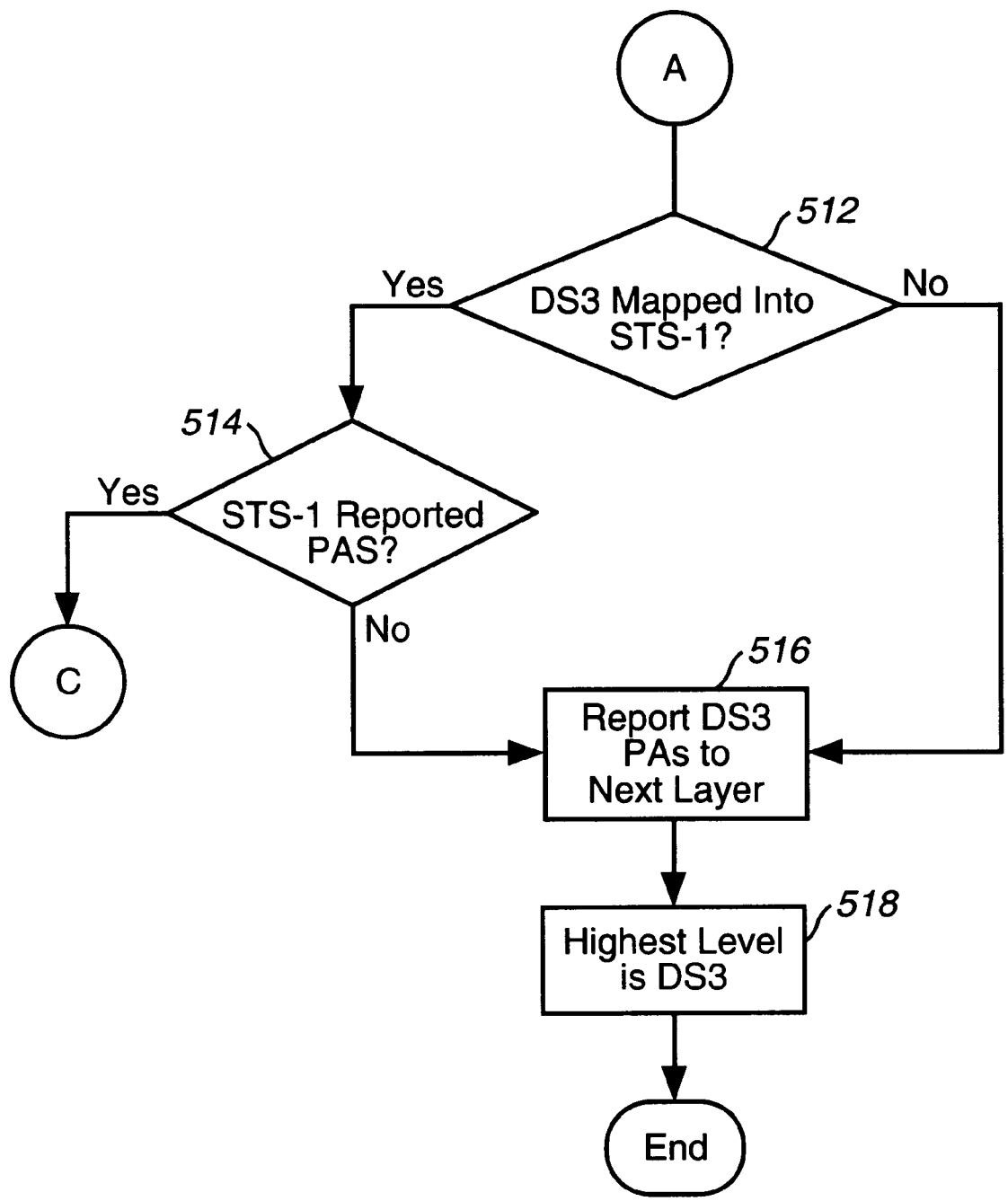

Returning to step 506, if the DS3 in which the DS1 is mapped does report a PAS, the process continues to step 512 of FIG. 5B. At step 512, element manager 141 determines whether the DS3 is mapped into a STS-1. If the DS3 is not mapped into an STS-1, the DS3 PAS is reported to network manager 131 at step 516. Thereafter, the highest transport level is identified as a DS3. If element manager 141 determines, at step 314, that the DS3 is mapped into an STS-1, element manager 141 then determines whether the STS-1 has reported a PAS. If a STS-1 PAS was not reported, the DS3 PAS is reported to network manager 131.

Figure 5C:
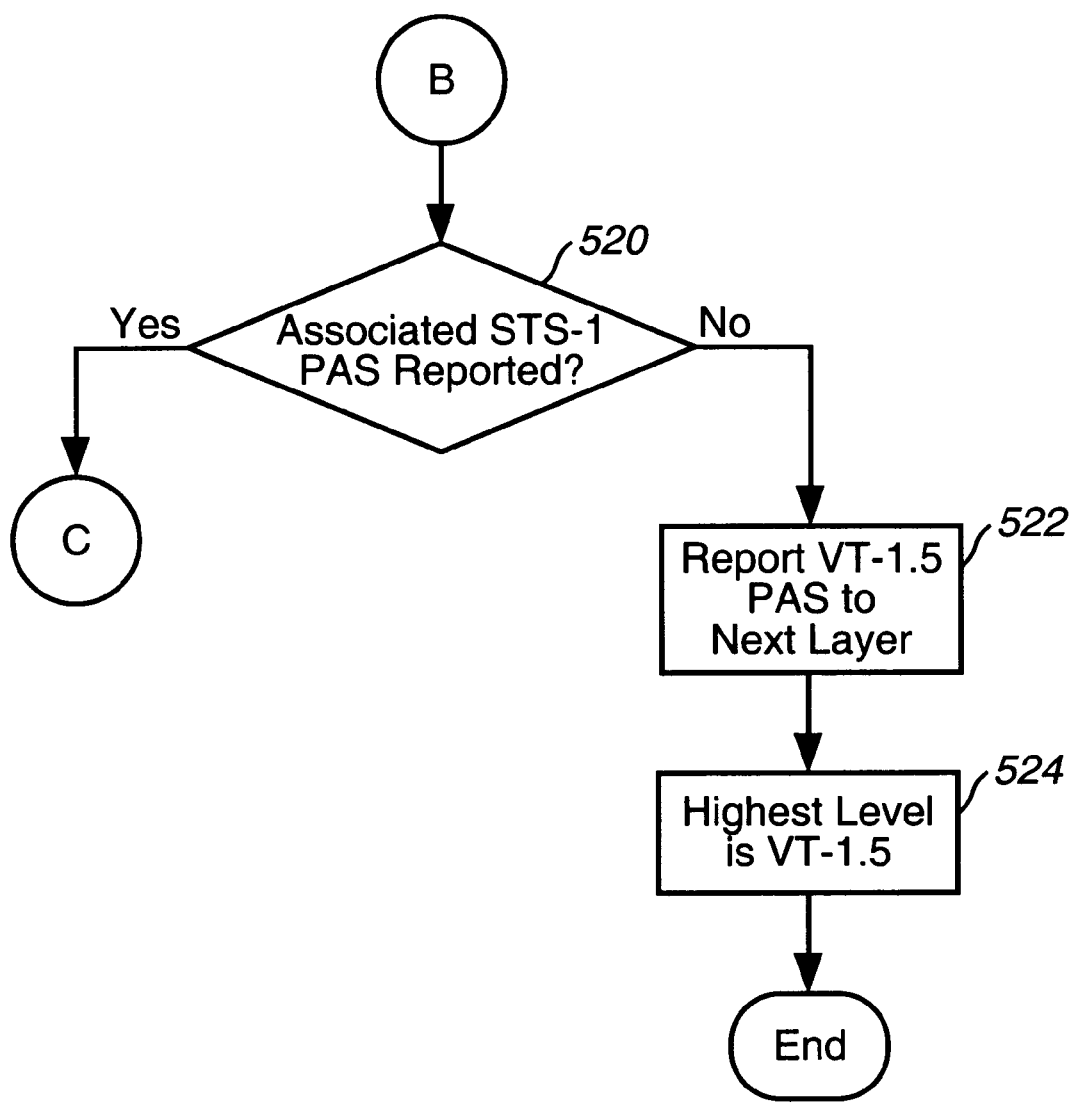

Returning to step 504, if the VT-1.5 in which the DS1 is mapped does report a PAS, the process continues to step 520 of FIG. 5C. At step 520, element manager 141 determines whether the STS-1 in which the VT-1.5 is mapped has reported a PAS. Here, no determination is made as to whether the VT-1.5 is mapped into a STS-1. This results because a VT-1.5 channel cannot exist in the network independently of a STS-1 channel. If the associated STS-1 in which the VT-1.5 is mapped has not reported a PAS, the VT-1.5 PAS is reported to network manager 131 at step 522. Next, the highest transport level is identified as a VT-1.5 channel at step 524.

Figure 5D:
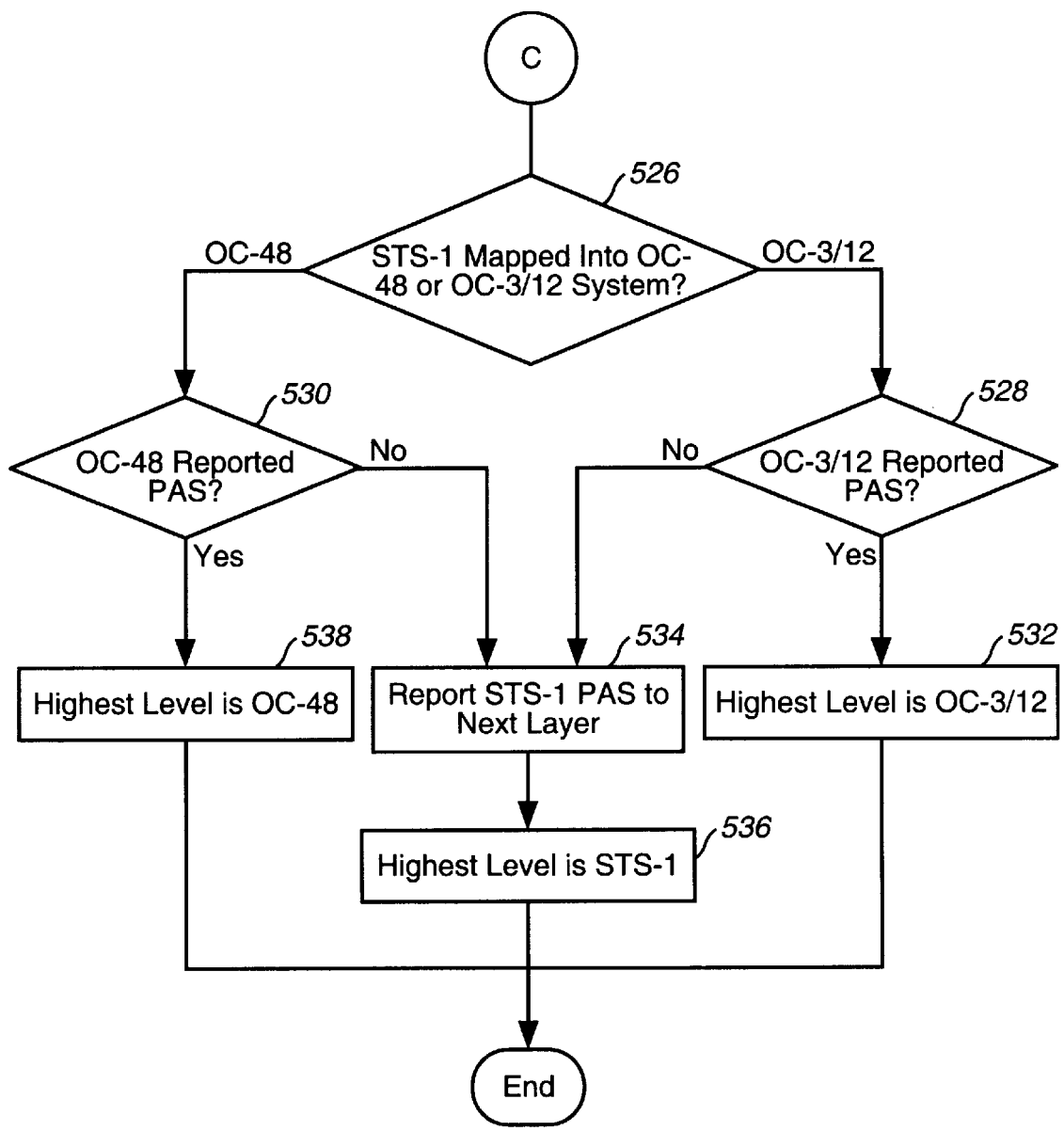

If element manager 141 determines at either step 514 or step 520 that a STS-1 has reported a PAS, the process continues at step 526 of FIG. 5D. At step 526, element manager 141 determines whether the STS-1 is mapped into an OC-48 system or an OC-3/12 system. An OC-48 system is generally used to transport STS-1s between two nodes in the network. An OC-3 or OC-12 system, on the other hand, is generally used to transport STS-1s between network elements within a particular node. For example, an OC-3 or OC-12 fiber optic link could be used to transport STS-1s between an OC-48 line terminating equipment (LTE) and a broadband digital cross-connect system (BBDCS).

If element manager 141 determines at step 526 that the STS-1 is mapped into an OC-3/12 system, element manager 141 then determines, at step 328, whether the OC-3/12 system has reported a PAS. If the OC-3/12 system has reported a PAS, the highest transport level is identified as a OC-3/12 at step 532. Conversely, if the OC-3/12 system has not reported a PAS, a STS-1 PAS is reported to network manager 131 at step 534. Next, the highest transport level is identified as a STS-1 at step 536.

If element manager 141 determines at step 526 that the STS-1 is mapped into an OC-48 system, element manager 141 then determines, at step 530, whether the OC-48 system has reported a PAS. If the OC-48 system has reported a PAS, the highest transport level is identified as a OC-48 at step 538. Conversely, if the OC-48 system has not reported a PAS, a STS-1 PAS is reported to network manager 131 at step 534. In this case, the highest transport level is identified as a STS-1 at step 536.

As the flow chart of FIGS. 5A–5D illustrate, this aspect of root cause analysis seeks to identify the highest transport level that is experiencing simultaneous error activity. Note that while all non-zero error activity is reported to the higher layers in network management system 100, only the highest level path PAS is forwarded to NML 130. This reduces the amount of trouble isolation processing that occurs at NML 130. Generally, the identification of the highest level path PAS allows network management system 100 to identify the true source of the network error activity. Note also that the identification process of FIGS. 5A–5D need not begin at the DS1 level. For example, the identification process could begin at step 512 after a DS3 PAS is reported.

Having described the general correlation process between signal transport levels, a simple example is provided with reference to FIG. 2. In this example, assume that a STS-1 channel is provisioned between source 202 and destination 204. Assume further that PMPs are associated with source 202 and destination 204 and SMPs are associated with multiplexer 210, cross-connect 240, and regenerators 220 and 230. Both the PMPs and SMPs are activated. If errors are generated in any of network elements 202, 210, 220, 230, 240 in the end-to-end path, a STS-1 path PAS may be generated by a PMP associated with destination 204. After receipt of a STS-1 path PAS, the correlation process continues at step 526 of FIG. 5D. At step 526, a layer in network management system 100 determines whether the STS-1 is mapped into an OC-48 or OC-3/12 system. This determination is based upon a retrieved topology of the provisioned channel. In this example, the STS-1 is mapped into the OC-N system that defines line entity 257. Assuming that the OC-N system is an OC-48 system, the correlation process proceeds to step 530 where it is determined whether the OC-48 system has reported a PAS.

The determination at step 530 can be answered in the affirmative if the SMP that is associated with cross-connect 240, reports a line PAS for the STS-48 signal. If this is the case, the STS-1 path PAS is correlated to the OC-48/STS-48 line PAS. At this point, the root cause analysis has narrowed the potential source of the error activity to line entity 257. Further identification of the root cause of the problem is provided by an additional correlation between PASs for line entity 257 and PASs for section entities 252–254.

Having described a correlation process between path, line and section PASs along the circuit topology of a single provisioned channel, a correlation process between independent path PASs is now provided. As described above, each path PAS that is received by a layer in network management system 100 could require independent root cause analysis consideration. Root cause analysis would generally seek to narrow the consideration from a path level to a line or section level using the correlation processes outlined above.

Note, however, that error activity detected for a path entity may not necessarily be identified at line or section entities. This results due to the error monitoring process for line and section entities. Consider the span defined by section entity 251 and line entity 256 of FIG. 2. In this example, the line and section overhead bytes are inserted into the transport overhead part of a STS-1 frame at source 202. These line and section overhead bytes are extracted by multiplexer 210. Included within the line and section overhead bytes is a bit interleaved parity byte (BIP-8) that provides even parity over the previous STS-1 frame. The BIP-8 is determined by source 202 after the previous STS-1 frame is scrambled at source 202 prior to an electrical-to-optical conversion to the OC-1 signal. Upon receipt of the BIP-8, multiplexer 210 can determine whether a received scrambled STS-1 contains any errors.

After the error calculation and subsequent unscrambling, the STS-1 is provided as one of the low-speed inputs to multiplexer 210. If multiplexer 210 is an OC-48 system, 48 STS-1s are byte-interleaved multiplexed into a STS-48 signal. After scrambling, the STS-48 signal is converted into an OC-48 signal for transmission to regenerator 252. In this process, note that errors can be generated internally by multiplexer 210. For example, a multiplexing card (not shown) within multiplexer 210 could introduce errors into the SPE of one of the 48 STS-1 signals. Since these errors were introduced prior to the scrambling of the STS-48 signal, the errors would not be detected by the line and section entity error calculations. These errors will be detected by the path entity error detection process. Specifically, the PMP associated with destination 204 can monitor the errors and generate a path PAS.

As noted above, multiplexer 210 can multiplex 48 STS-1 s into the OC-48 signal. Each of these 48 STS-1 s could traverse independent paths throughout the network and terminate on independent destinations. If multiplexer 210 generates errors on each of the 48 STS-1s, then potentially 48 separate STS-1 path PASs could be generated. Correlation between these path PASs could quickly identify multiplexer 210 as the root cause of all the error activity.

Figure 6:
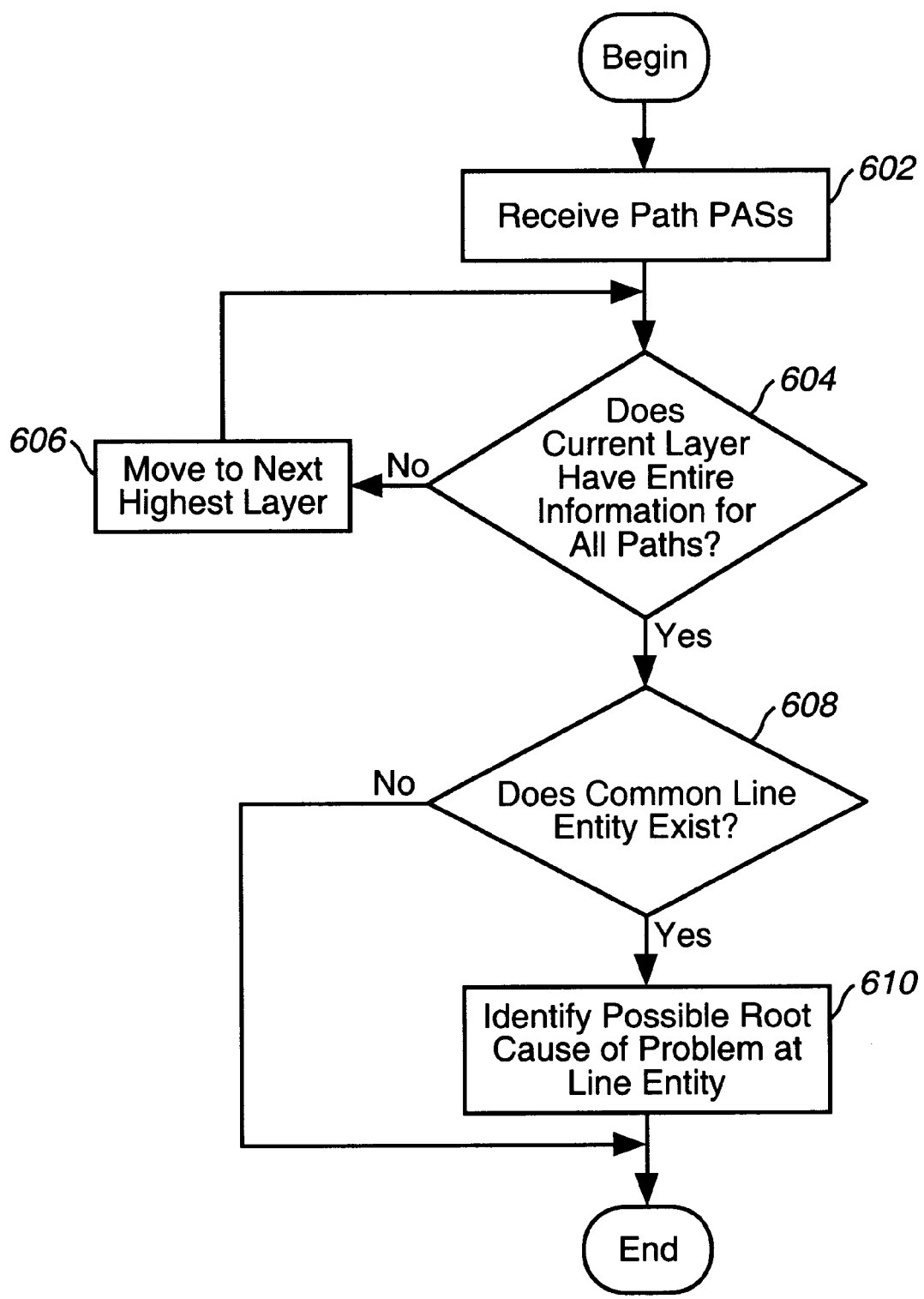
FIGS. 6 and 10 illustrate flow charts of the correlation between path entities.

FIG. 6 illustrates the path PAS correlation process. This process begins at step 602 where a layer in network management system 100 receives a plurality of path PASs. Next, at step 604, the layer determines whether it has entire information for all of the paths that have reported a PAS. If the layer determines at step 606 that it does not have enough information, the root cause analysis must be performed by one of the higher layers in network management system 100. This is illustrated by step 606. If the layer determines at step 606 that it does have enough information, then the process continues to step 608. At step 608, the layer determines whether a common line entity exists. If the layer determines at step 608 that a common line entity does not exist then the process ends. Conversely, if the layer determines at step 608 that a common line entity does exist, a possible root cause of the problem is identified at step 610.

As described above, this possible root cause may represent a convergence point of paths that generate path PASs. By identifying a convergence point, the layer bypasses redundant processing of the individual path PASs. Speed and efficiency of error detection and correction is thereby improved.

In a second embodiment of the present invention, layers within network management system 100 use raw performance monitoring (PM) data to identify root causes of problems in the network. One goal of raw PM data analysis is to identify network problems at the earliest possible stage. In other words, it is desirable for a service provider to identify a potential network problem before any significant effects are felt by the customer. In this manner, the service provider is able to correct a problem before the customer is aware that a problem exists.

One example of a potential problem is the existence of "dribble" errors. In this context, dribble errors are used to refer to a situation where a system is operating satisfactorily but not error-free. Errors that are reported by the monitoring points to the layers in network management system 100 are typically not large enough to cause a monitoring point to declare a PAS. Ordinarily, these non-zero error reports would not prompt any action by a service provider. However, these non-zero errors could indicate that a network element is operating at a point near the acceptable tolerance levels. Numerous examples exist. Intermittent errors could simply be caused by a dirty connector in a fiber-optic link. In other cases, synchronization shifts could cause jitter tolerance levels to be exceeded. In other examples, temperature or humidity variations could cause network element performance to periodically degrade.

Regardless of the cause, intermittent non-zero error reports will be provided to the layers in network management system 100. Each layer in network management system 100 can independently analyze the existence of non-zero error activity over a period of time. Experience in the analysis of the non-zero error activity can lead to a correlation between specific patterns of error activity with the existence of specific network problems. Any means of statistical analysis can be used as a means for triggering a root cause analysis process. For example, if specific patterns of error activity are known to lead to certain failures, general pattern recognition systems (e.g., neural networks) can be used for triggering purposes. As noted above, this statistical analysis can be performed at each layer of network management system 100 simultaneously. The only difference in processing is the scope of PM data that is available to an element in the particular layer in network management system 100.

Figure 7:
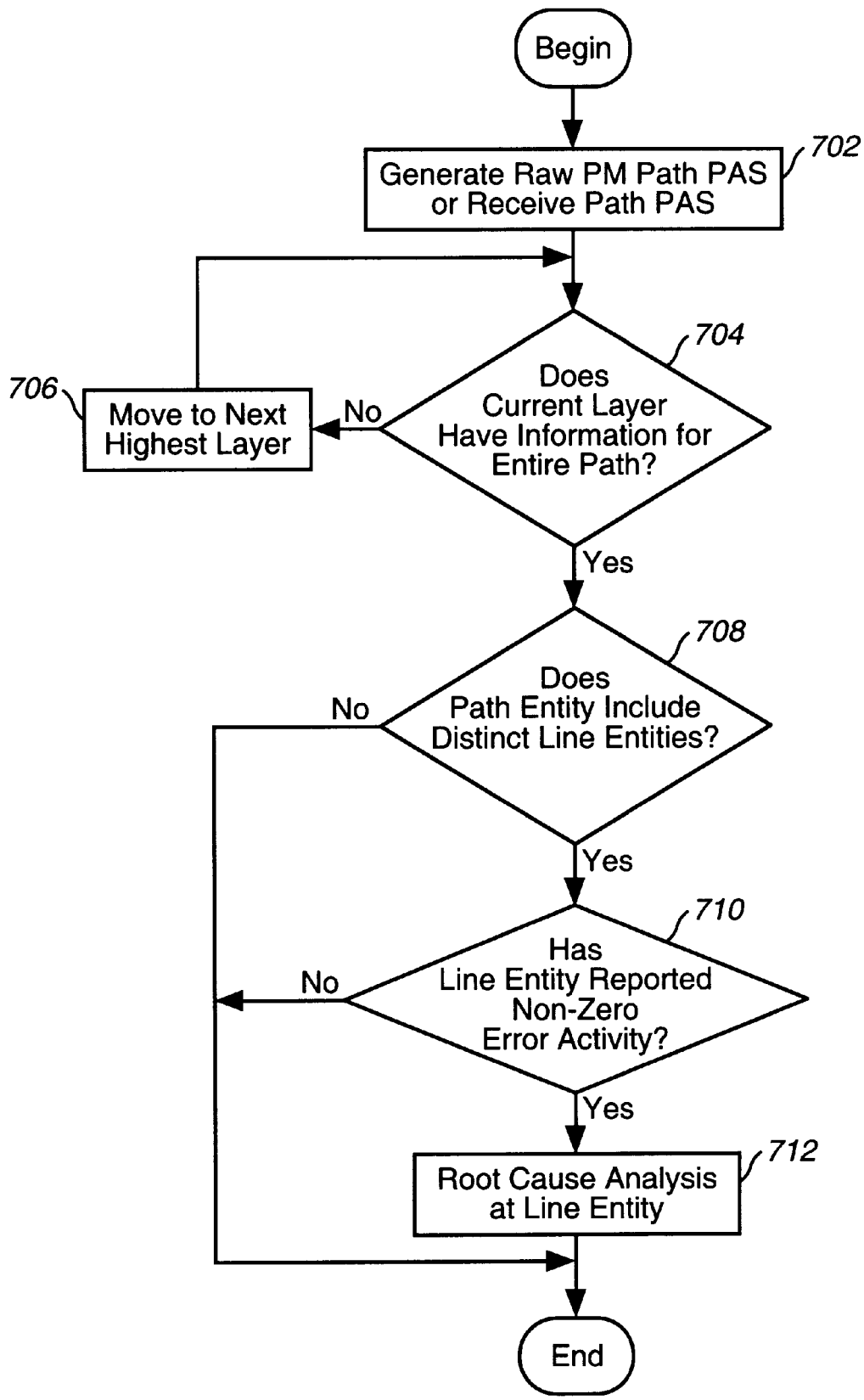

FIG. 7 illustrates a flow chart of the path and line entity correlation process in the second embodiment. The process begins at step 702 upon the generation of a raw PM path PAS. A raw PM path PAS is generated by one of the layers in network management system 100 upon an analysis of the reported raw PM path data. As noted above, analysis of patterns of error activity over time could cause a layer in network management system 100 to identify a potential network problem. Note that a raw PM path PAS is generated by a layer in network management system 100 while a regular path PAS is generated by a monitoring point associated with a network element. As further illustrated at step 702 of FIG. 7, a regular path PAS could also be used in the unreported root cause analysis.

After a raw PM path PAS is generated or a regular path PAS is received by a layer in network management system, the layer determines whether it has enough information to determine the root cause. This process is represented by the loop of steps 704 and 706. After a layer in network management system determines at step 706 that it has enough information to determine the root cause, the process continues to step 708.

If a layer determines, at step 708, that the path entity does not include distinct line entities, then the path-line correlation process of FIG. 7 ends. In this case, the unreported root cause analysis cannot be further narrowed to a part of the path entity. However, if the layer determines, at step 708, that the path entity does include distinct line entities, then the layer next determines, at step 710, whether a line entity within the path entity has reported non-zero error activity.

If none of the line entities within the path entity has reported non-zero error activity, then the path-line correlation process ends. As noted above, this situation may result if the monitoring points associated with the line entities have not have been activated. Subsequent activation of the monitoring points will allow further unreported root cause analysis in a later monitoring period.

Finally, if the layer determines, at step 710, that a line entity has reported non-zero error activity, then the root cause of the network problem is narrowed to a particular line entity. Additional root cause analysis then proceeds at step 712 to further identify the root cause of the problem within the identified line entity.

Figure 8:
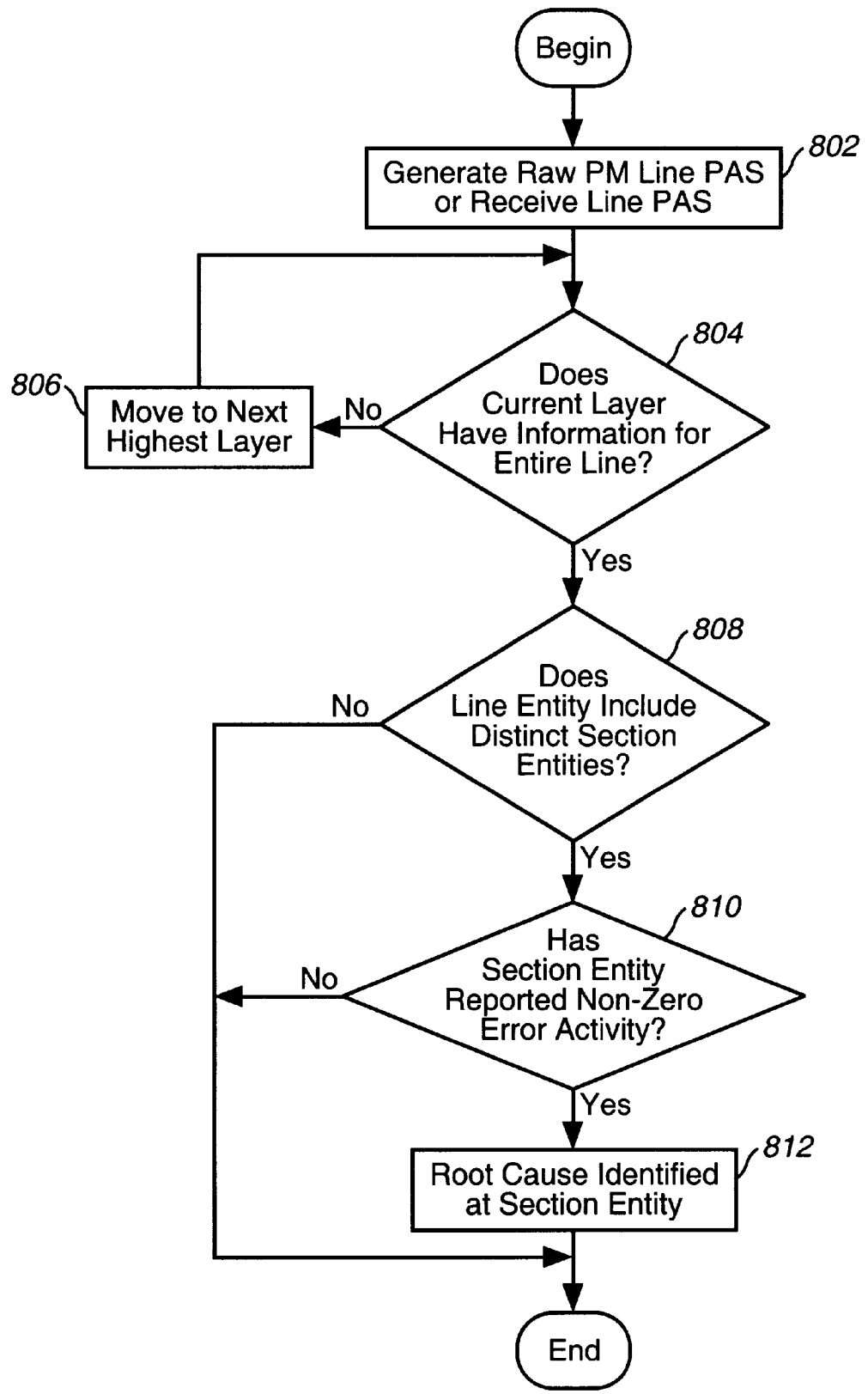

FIG. 8 illustrates a second method of unreported root cause analysis that is based upon the correlation of error activity in line entities and section entities. The line-section correlation process begins at step 802 where a layer in network management system 100 generates a raw PM line PAS or receives a regular PAS from a monitoring point. After a raw PM line PAS is generated or a regular path PAS is received by a layer in network management system, the layer determines whether it has enough information to determine the root cause. This process is represented by the loop of steps 804 and 806. After a layer in network management system determines at step 806 that it has enough information to determine the root cause, the process continues to step 808.

At step 808, the layer determines whether a distinct section entity exists for the line entity. If element manager 143 determines, at step 808, that the line entity does not include distinct section entities, then the line-section correlation process of FIG. 8 ends. In this case, the unreported root cause analysis cannot be further narrowed to a part of the line entity. However, if the layer determines, at step 808, that the line entity does include distinct section entities, then the layer next determines, at step 810, whether a section entity within the line entity has reported non-zero error activity.

If none of the section entities within the line entity has reported non-zero error activity, then the line-section correlation process ends. Finally, if the layer determines, at step 810, that a section entity has reported non-zero error activity, then the root cause of the network problem is narrowed to the particular section entity. Since the section entity is the lowest level of granularity, the unreported root cause analysis is complete. Thus, at step 812, the section entity is identified as the root cause of the network problem.

As described above, a function of the unreported root cause analysis is to correlate non-zero error activity. Raw PM path PASs can be correlated with non-zero zero error activity on a line entity and raw PM line PASs can be further correlated to non-zero error activity on a section entity. In a similar manner to the reported root cause analysis, the unreported root cause analysis correlates non-zero error activity between various signal levels in the transport hierarchy. In this correlation process, the highest rate in the transport signal hierarchy experiencing simultaneous error activity is identified. FIGS. 9A–9D illustrate this correlation process. In the following description, assume that a layer in network management system 100 has either generated a raw PM DS1 path PAS or received a regular DS1 PAS from a monitoring point.

Figure 9A:
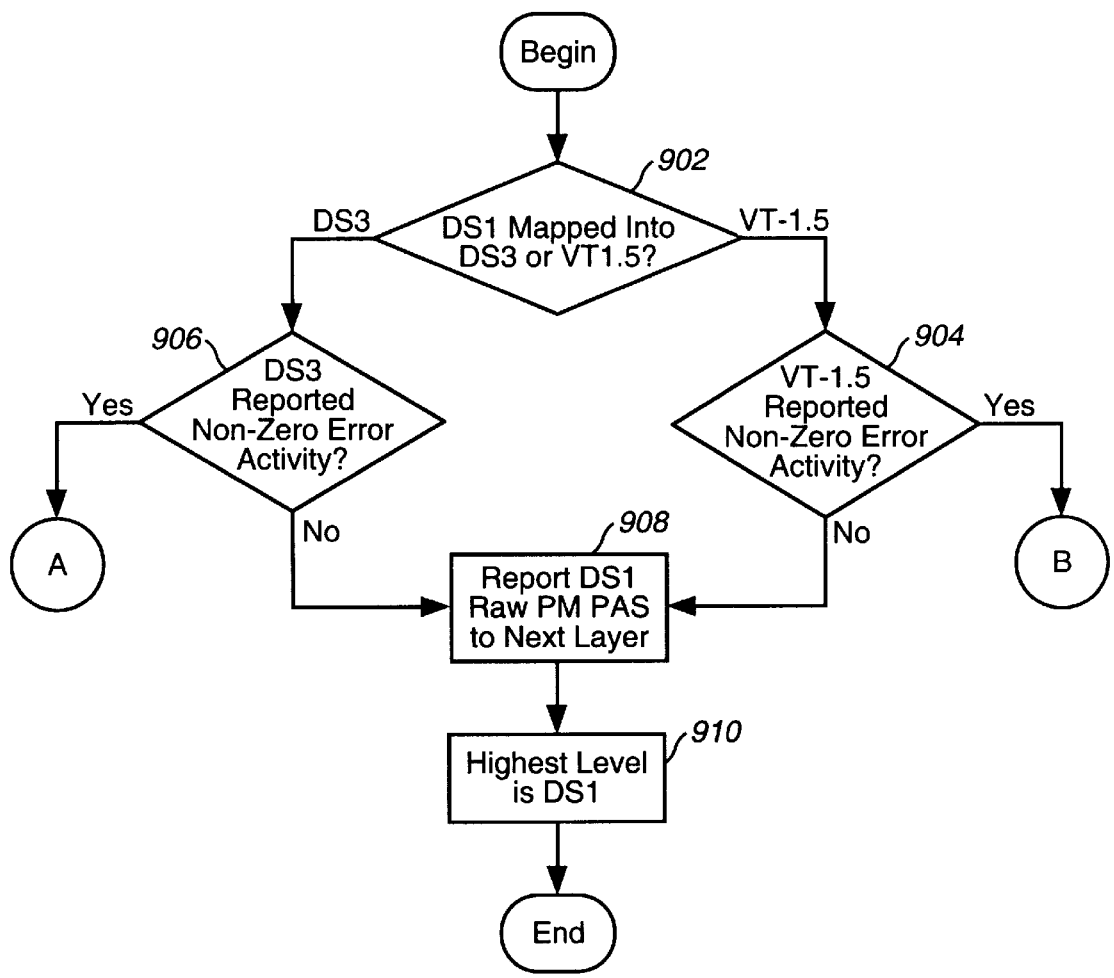

The transport level determination process begins at step 902 of FIG. 9A. At step 902, the layer determines whether the DS1 channel is mapped into a DS3 channel or into a VT-1.5 channel. If the DS1 channel is mapped into a DS3 channel, the process continues at step 906. At step 906, the layer determines whether the DS3 in which the DS1 is mapped has reported non-zero error activity. In a similar manner to step 906, step 908 is invoked if the layer determines, at step 902, that the DS1 is mapped into a VT-1.5 channel. At step 908, the layer determines whether the VT-1.5 in which the DS1 is mapped has reported non-zero error activity. In the simplest example for either scenario, the layer determines whether non-zero error activity has been recorded for the same monitored parameter identified in the original statistical analysis.

If the determination at either step 904 or step 906 determines that the VT-1.5 or DS3, respectively, has not reported non-zero error activity, then the layer, at step 908, reports the DS1 raw PM PAS to the next highest layer in network management system 100. Next, at step 910, the highest transport level is identified as a DS1 and the process ends.

Figure 9B:
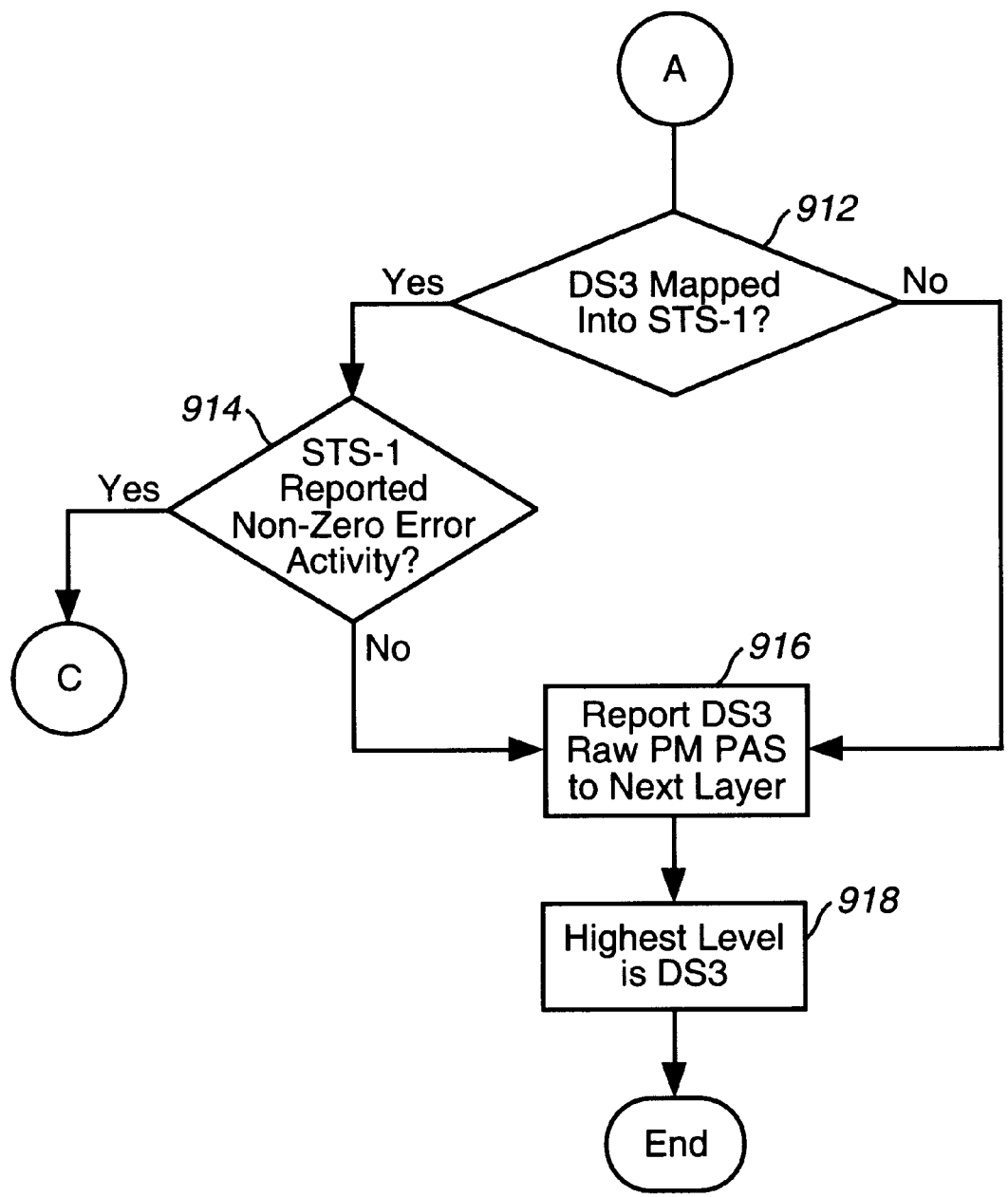

Returning to step 906, if the DS3 in which the DS1 is mapped does report non-zero error activity, the process continues to step 912 of FIG. 9B. At step 912, the layer determines whether the DS3 is mapped into a STS-1. If the DS3 is not mapped into an STS-1, the DS3 raw PM PAS is reported to the next highest layer at step 916. Thereafter, the highest transport level is identified as a DS3 at step 918. If the layer determines, at step 914, that the DS3 is mapped into an STS-1, the layer then determines whether the STS-1 has reported non-zero error activity at step 914. If non-zero error activity was not reported, the DS3 raw PM PAS is reported to the next highest layer.

Figure 9C:
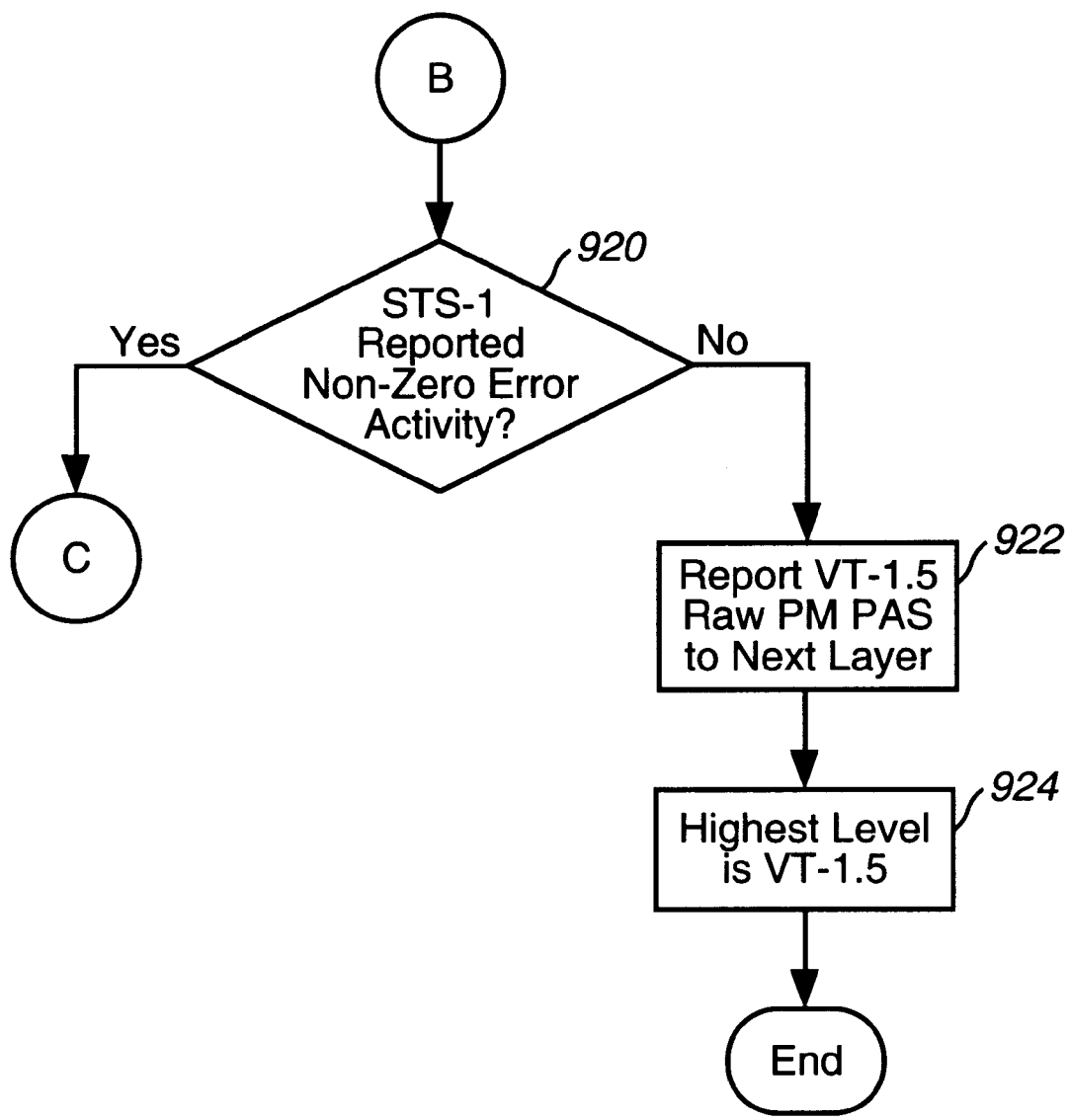

Returning to step 904, if the VT-1.5 in which the DS1 is mapped does report non-zero error activity, the process continues to step 920 of FIG. 9C. At step 920, the layer determines whether the STS-1 in which the VT-1.5 is mapped has reported non-zero error activity. If the associated STS-1 in which the VT-1.5 is mapped has not reported non-zero error activity, the VT-1.5 raw PM PAS is reported to the next highest layer at step 922. Next, the highest transport level is identified as a VT-1.5 channel at step 924.

Figure 9D:
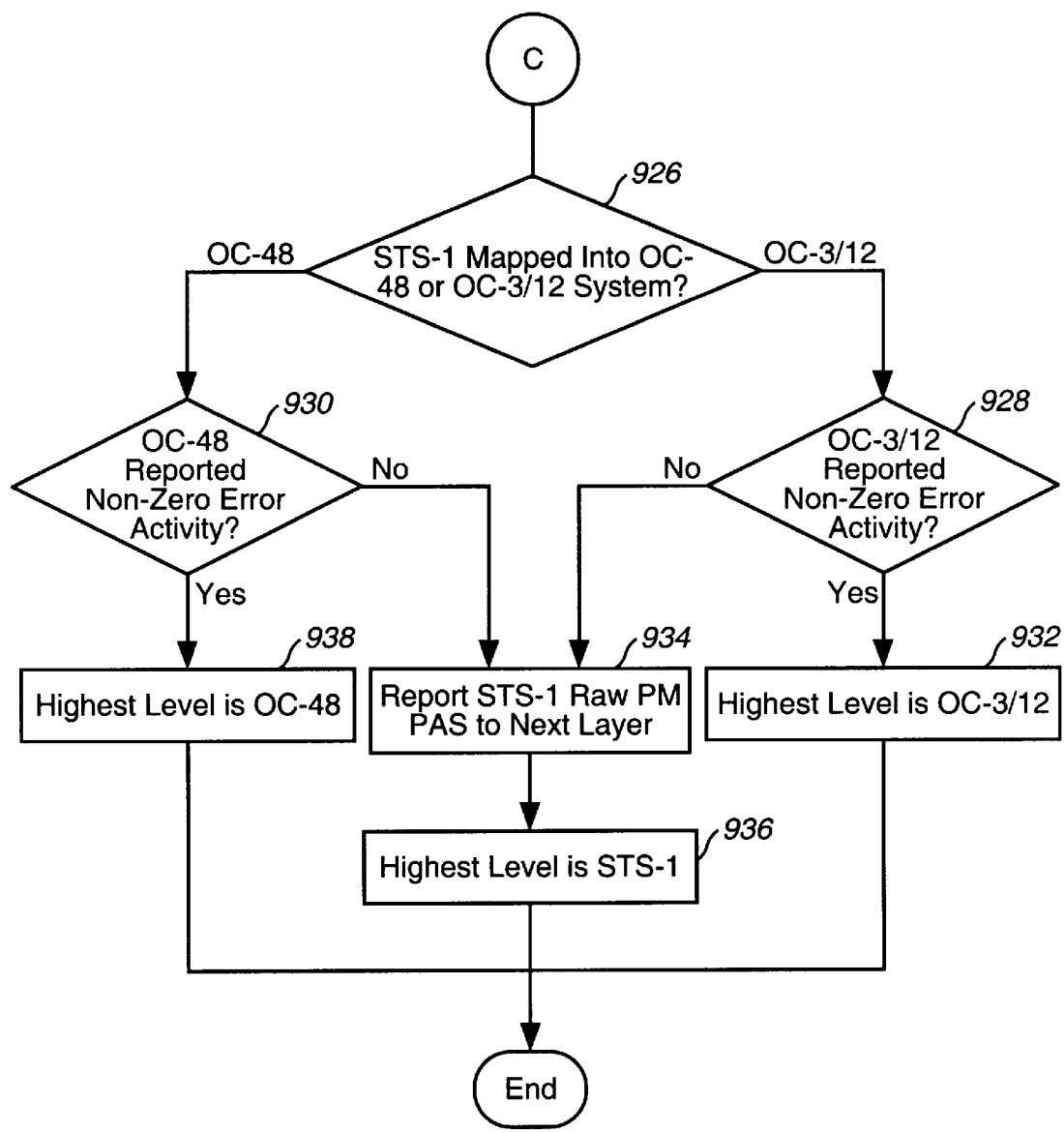

If the layer determines at either step 914 or step 920 that a STS-1 has reported non-zero error activity, the process continues at step 926 of FIG. 9D. At step 926, the layer determines whether the STS-1 is mapped into an OC-48 system or an OC-3/12 system. If the layer determines at step 926 that the STS-1 is mapped into an OC-3/12 system, the layer then determines, at step 928, whether the OC-3/12 system has reported non-zero error activity. If the OC-3/12 system has reported non-zero error activity, the highest transport level is identified as a OC-3/12 at step 932. Conversely, if the OC-3/12 system has not reported non-zero error activity, a STS-1 raw PM PAS is reported to the next highest layer at step 934. The highest transport level is then identified as a STS-1 at step 936.

If the layer determines at step 926 that the STS-1 is mapped into an OC-48 system, the layer then determines, at step 930, whether the OC-48 system has reported non-zero error activity. If the OC-48 system has reported non-zero error activity, the highest transport level is identified as a OC-48 at step 938. Conversely, if the OC-48 system has not reported non-zero error activity, a STS-1 raw PM PAS is reported to the next highest layer at step 934. In this case, the highest transport level is identified as a STS-1 at step 936.

As the flow chart of FIGS. 9A–9D illustrate, the present invention seeks to identify the highest transport level that is experiencing simultaneous error activity. Note again that the identification process of FIGS. 9A–19D need not begin at the DS1 level. For example, the statistical analysis could identify a potential problem at the DS3 level. In this case, the process described in FIGS. 9A–9D begins at step 912.

Figure 10:
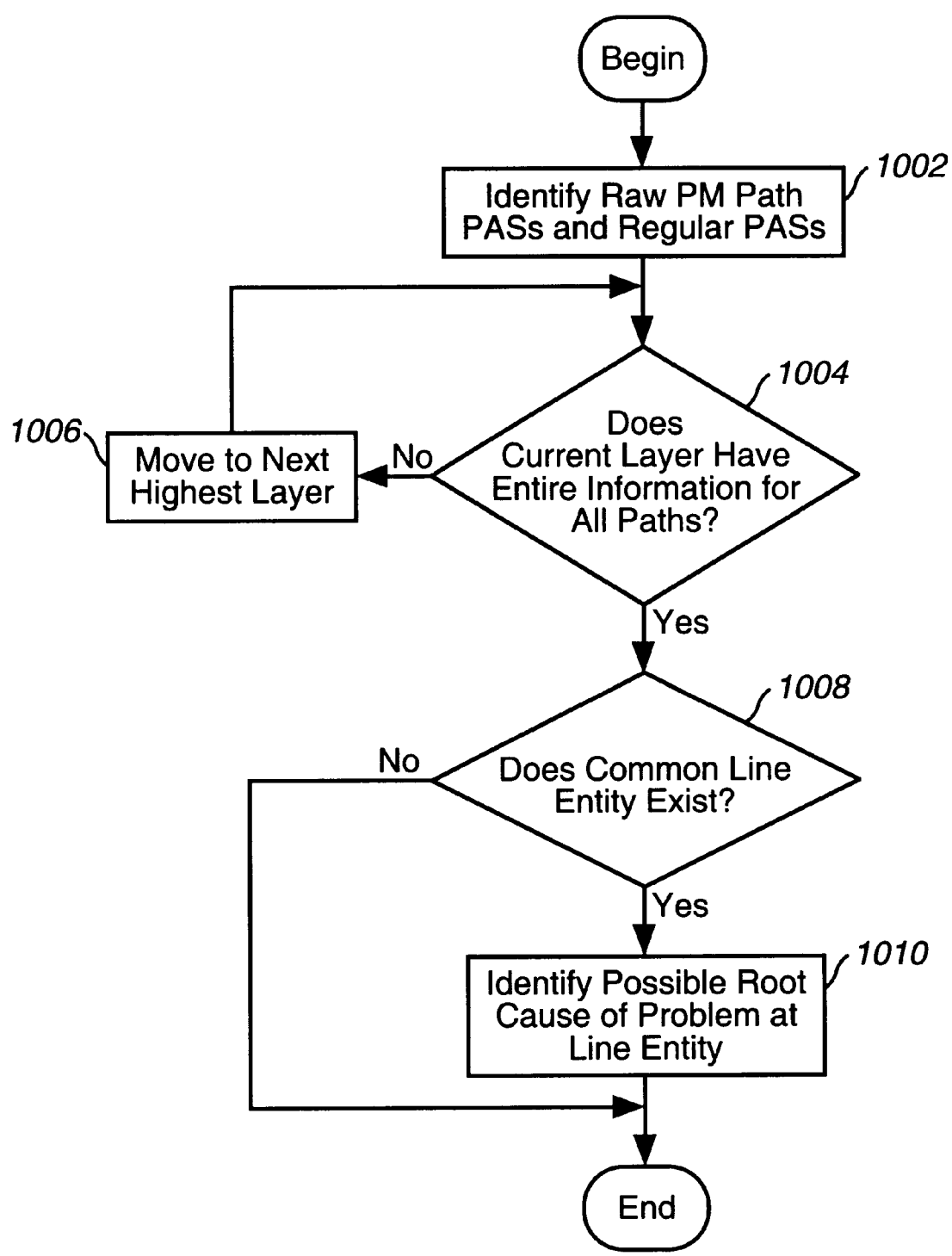

FIG. 10 illustrates the process of correlating path PASs. This process begins at step 1002 where a layer in network management system 100 identifies a plurality of path PASs. These path PASs include both raw PM path PASs and regular PASs. The raw PM path PASs may be generated by any of the layers within network management system 100.

After the plurality of path PASs are identified, the layer determines at step 1004 whether it has entire information for all of the paths that have reported a PAS. If the layer determines at step 1004 that it does not have enough information, the root cause analysis must be performed by one of the higher layers in network management system 100. This is illustrated by step 1008. If the layer determines at step 1006 that it does have enough information, then the process continues to step 1008. At step 1008, the layer determines whether a common line entity exists. If the layer determines at step 1008 that a common line entity does not exist then the process ends. Conversely, if the layer determines at step 1008 that a common line entity does exist, a possible root cause of the problem is identified at step 1010. In a similar manner to the reported root cause analysis, the correlation of path PASs allows a layer to bypass redundant processing of the path PASs individually.

Figure 11:
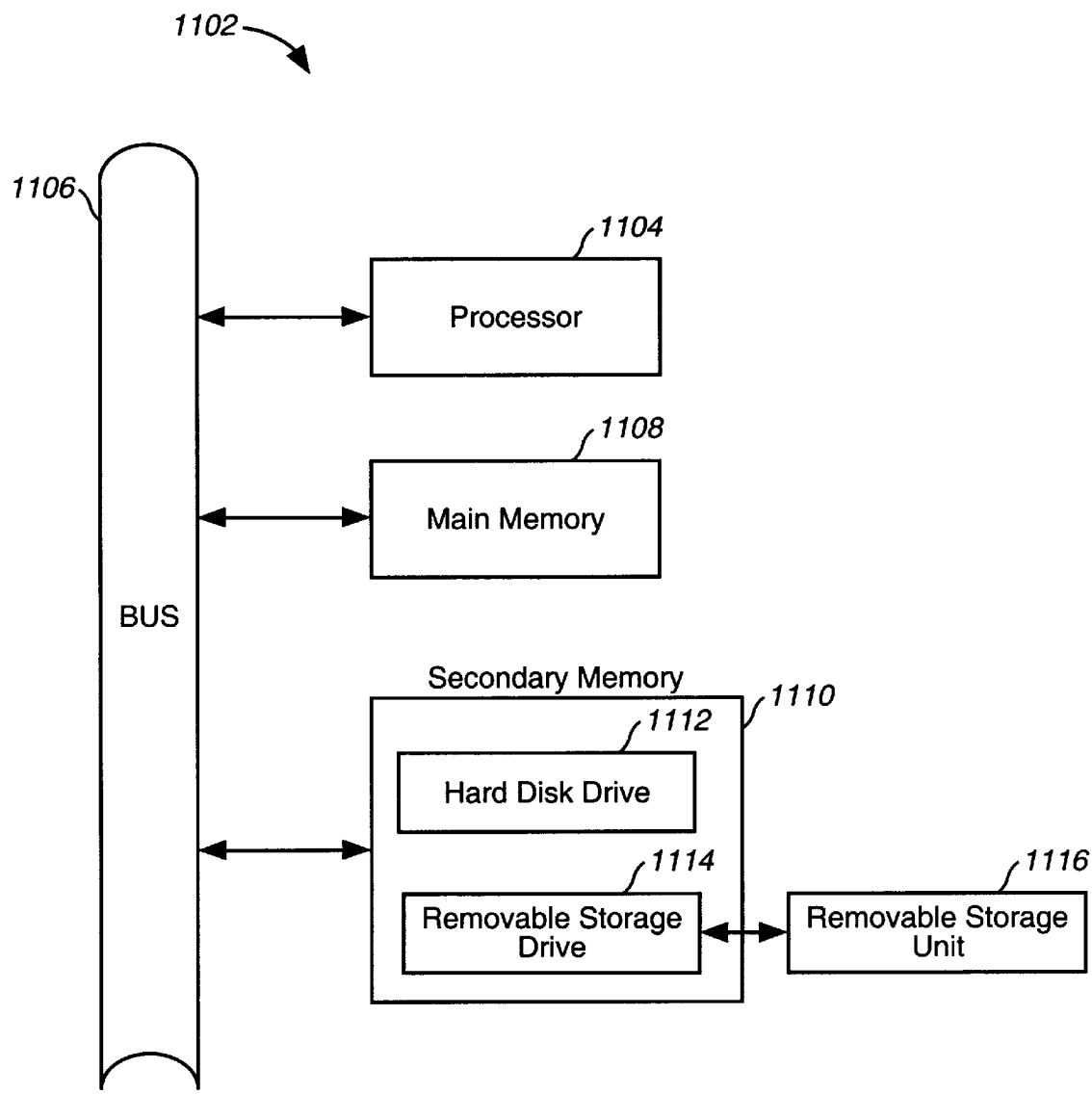
FIG. 11 illustrates a block diagram of a computer useful for implementing elements of the present invention.

In one embodiment, the invention is directed to a computer system operating as discussed herein. For example, functions in each layer of network management system 100 is implemented using computer systems. An exemplary computer system 1102 is shown in FIG. 11. The computer system 1102 includes one or more processors, such as processor 1104. The processor 1104 is connected to a communication bus 1106.

The computer system 1102 also includes a main memory 1108, preferably random access memory (RAM), and a secondary memory 1110. The secondary memory 1110 includes, for example, a hard disk drive 1112 and/or a removable storage drive 1114, representing a floppy disk drive, a magnetic tape drive, a compact disk drive, etc. The removable storage drive 1114 reads from and/or writes to a removable storage unit 1116 in a well known manner.

Removable storage unit 1116, also called a program storage device or a computer program product, represents a floppy disk, magnetic tape, compact disk, etc. As will be appreciated, the removable storage unit 1116 includes a computer usable storage medium having stored therein computer software and/or data.

Computer programs (also called computer control logic) are stored in main memory and/or the secondary memory 1110. Such computer programs, when executed, enable the computer system 1102 to perform the features of the present invention as discussed herein. In particular, the computer programs, when executed, enable the processor 1104 to perform the features of the present invention. Accordingly, such computer programs represent controllers of the computer system 1102.

In another embodiment, the invention is directed to a computer program product comprising a computer readable medium having control logic (computer software) stored therein. The control logic, when executed by the processor 1104, causes the processor 1104 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

While the invention has been particularly shown and described with reference to preferred embodiments thereof, it will be understood by those skilled in the relevant art that various changes in form and details may be made therein without departing from the spirit and scope of the invention.

What is claimed is:

1. A method, in a layer of a network, management system, for identifying a root cause of a problem in a provisioned channel in a network, the provisioned channel being routed through a plurality of network elements, the method comprising the steps of:

(1) receiving performance monitoring data gathered for section, line and path entities by a plurality of monitoring points during, a monitoring period, each of said plurality of monitoring points being associated with a network element; and (2) identifying a correlation between any error activity in said section, line and path entities as indicated by said performance monitoring data that is received from at least two different ones of said plurality of monitoring points to locate a root cause of a problem in either said section, line or path entities of the provisioned channel.

2. The method of claim 1, wherein said step (2) comprises the steps of:

(a) analyzing performance monitoring data at a first signal transport level reported from a first monitoring point to determine whether a potential problem exists;

(b) identifying a second signal transport level that experiences corresponding error activity, said error activity being reported by a second monitoring point, wherein said first signal transport level is mapped into said second signal transport level; and (c) identifying a third monitoring point upstream of said second monitoring point that reports corresponding error activity.

3. The method of claim 2, wherein said step (b) is repeated until a highest transport level is identified.

4. The method of claim 2, further comprising the step of discontinuing further processing for problem alert signals that are received by the layer in the network management system from monitoring points downstream from said first monitoring point, wherein said problem alert signals correspond to the error activity reported by said first monitoring point.

5. The method of claim 1, wherein said step (2) comprises the steps of:

(a) analyzing performance monitoring data reported by a monitoring point associated with a line entity to determine whether a potential problem exists;

(b) determining whether said line entity includes a plurality of section entities;

(c) determining whether a monitoring point associated with a section entity within said line entity has reported corresponding error activity; and (d) initiating a problem handling process for said section entity, if a monitoring point associated with a section entity has reported corresponding error activity.

6. The method of claim 5, further comprising the step of:

(e) initiating a problem handling process for said line entity, if a monitoring point associated with a section entity has not reported corresponding error activity.

7. The method of claim 5, further comprising a step before said step (b) of determining the topology of the line entity.

8. The method of claim 1, wherein said step (2) comprises the steps of:

(a) analyzing performance monitoring data reported by a monitoring point associated with a path entity to determine whether a potential problem exists;

(b) determining whether said path entity includes a plurality of line entities;

(c) determining whether a monitoring point associated with a line entity within said path entity has reported corresponding error activity; and (d) initiating a problem handling process for said line entity, if a monitoring point associated with a line entity has reported corresponding error activity.

9. The method of claim 8, further comprising the step of:

(e) initiating a problem handling process for said path entity, if a monitoring point associated with a line entity has not reported corresponding error activity.

10. The method of claim 9, further comprising a step before said step (b) of determining the topology of the path entity.

11. The method of claim 1, wherein said step (2) comprises the steps of:

(a) analyzing performance monitoring data reported by monitoring points associated with a first and a second path entity to determine whether a potential problem exists;

(b) determining whether said first and second path entities include a common line entity; and (c) initiating a problem handling process for said common line entity, if a common line entity exists.

12. The method of claim 11, further comprising a step before said step (b) of determining the topology of said first and second path entities.

13. A system for identifying a root cause of a problem in a provisioned channel in a network, the provisioned channel being routed through a plurality of network elements, comprising:

(1) means for receiving performance monitoring data gathered for section, line and path entities from a plurality of monitoring points during a monitoring period, each of said plurality of monitoring points being associated with a network element; and (2) means for identifying a correlation between any error activity in said section, line and path entities as indicated by said performance monitoring data that is received from at least two different ones of said plurality of monitoring points to identify a root cause of a problem in either said section, line or path entities of the provisioned channel.

14. The system of claim 13, wherein said means for identifying comprises:

means for analyzing performance monitoring data at a first signal transport level reported from a first monitoring point to determine whether a potential problem exists;

means for identifying a second signal transport level that experiences corresponding error activity, said error activity being reported by a second monitoring point, wherein said first signal transport level is mapped into said second signal transport level; and means for identifying a third monitoring point upstream of said second monitoring point that reports corresponding error activity.

15. The system of claim 14, further comprising means for identifying a highest signal transport level that experiences corresponding error activity.

16. The system of claim 14, further comprising means for discontinuing further processing for problem alert signals that are received by the layer in the network management system from monitoring points downstream from said first monitoring point, wherein said problem alert signals correspond to the error activity reported by said first monitoring point.

17. The system of claim 13, wherein said means for identifying comprises:

means for analyzing performance monitoring data reported by a monitoring point associated with a line entity to determine whether a potential problem exists;

means for determining whether said line entity includes a plurality of section entities;

means for determining whether a monitoring point associated with a section entity within said line entity has reported corresponding error activity; and means for initiating a problem handling process for said section entity, if a monitoring point associated with a section entity has reported corresponding error activity.

18. The system of claim 17, further comprising:

means for initiating a problem handling process for said line entity, if a monitoring point associated with a section entity has not reported corresponding error activity.

19. The system of claim 17, further comprising means for determining the topology of the line entity.

20. The system of claim 13, wherein said means for identifying comprises:

means for analyzing performance monitoring data reported by a monitoring point associated with a path entity to determine whether a potential problem exists;

means for determining whet her said path entity includes a plurality of line entities;

means for determining whether a monitoring point associated with a line entity within said path entity has reported corresponding error activity; and means for initiating a problem handling process for said line entity, if a monitoring point associated with a line entity has reported corresponding error activity.

21. The system of claim 20, further comprising:

means for initiating a problem handling process for said path entity, if a monitoring point associated with a line entity has not reported corresponding error activity.

22. The system of claim 21, further comprising means for determining the topology of the path entity.

23. The system of claim 13, wherein said means for identifying comprises:

means for analyzing performance monitoring data reported by monitoring points associated with a first and a second path entity to determine whether a potential problem exists;

means for determining whether said first and second path entities include a common line entity; and means for initiating a problem handling process for said common line entity, if a common line entity exists.

24. The system of claim 23, further comprising means for determining the topology of said first and second path entities.

25. A computer program product, comprising:

a computer usable system medium having computer readable program code means embodied in said medium that identifies a root cause of a problem in a provisioned channel in a network, the provisioned channel being routed through a plurality of network elements, said computer readable program code means comprising:

first computer readable program code means for causing a computer to effect a reception of performance monitoring data gathered for section, line and path entities from a plurality of monitoring points during a monitoring period, each of said plurality of monitoring points being associated with a network element; and second computer readable program code means for causing a computer to effect an identification of a correlation between any error activity in said section, line and path entities as indicated by said performance monitoring data that is received from at least two different ones of said plurality of monitoring points to identify a root cause of a problem in either said section, line or path entities of the provisioned channel.

* * * * *